(12) United States Patent
Lai et al.

(10) Patent No.: US 12,189,091 B2
(45) Date of Patent: Jan. 7, 2025

(54) OPTICAL LENS ASSEMBLY AND PHOTOGRAPHING MODULE

(71) Applicant: NEWMAX TECHNOLOGY CO., LTD., Taichung (TW)

(72) Inventors: Shu-Tzu Lai, Taichung (TW); Ching-Yun Huang, Taichung (TW)

( * ) Notice: Subject to any disclaimer, the term of this patent is extended or adjusted under 35 U.S.C. 154(b) by 504 days.

(21) Appl. No.: 17/548,687

(22) Filed: Dec. 13, 2021

(65) Prior Publication Data

US 2023/0083945 A1     Mar. 16, 2023

(30) Foreign Application Priority Data

Sep. 16, 2021 (TW) ............................ 110134524
Nov. 3, 2021 (CN) .......................... 202111292475.9

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ....... G02B 13/0045; G02B 9/64; G02B 13/06
See application file for complete search history.

(56) References Cited

U.S. PATENT DOCUMENTS

2022/0099929 A1 *   3/2022   Huang ................. G02B 9/64

FOREIGN PATENT DOCUMENTS

WO    WO-2020107935 A1 *   6/2020   ......... G02B 13/0045

OTHER PUBLICATIONS

Machine Translation of WO2020107935 (Year: 2020).*

* cited by examiner

*Primary Examiner* — Collin X Beatty
(74) *Attorney, Agent, or Firm* — Bruce Stone LLP; Joseph A. Bruce

(57) ABSTRACT

An optical lens assembly includes, in order from the object side to the image side: a first lens with negative refractive power, a second lens with negative refractive power, a third lens with positive refractive power, a stop, a fourth lens with positive refractive power, a fifth lens with negative refractive power, a sixth lens with positive refractive power, and a seventh lens with negative refractive power, wherein a focal length of the first lens is f1, a focal length of the sixth lens is f6, and following condition is satisfied: $-5.74<f1/f6<-1.83$, which is favorable to reduce the impact of environmental temperature on the lens assembly and balance the distributing of the refractive power of the optical lens assembly, so as to correct the aberration and reduce the sensitivity.

20 Claims, 13 Drawing Sheets

OPTICAL LENS ASSEMBLY AND PHOTOGRAPHING MODULE

BACKGROUND

Field of the Invention

The present invention relates to an optical lens assembly and photographing module, and more particularly to an optical lens assembly and photographing module applicable to electronic products.

Description of Related Art

With the popularity of smartphone and tablet computer, small camera lenses can be widely used in various electronic devices, such as, game player, traffic recorder, security camera and so on. To make the security camera available all day, a dual-band optical system with visible and infrared light wavelengths is provided. In order to meet the high image quality of day and night camera, the security camera is often composed of two separate optical systems, which not only causes large size, but also the overall structure is complex. If the security camera is an optical system shared by both the visible and infrared light wavelengths, the image quality of the infrared light wavelength is poor. Therefore, how to develop a thin security camera having the image quality with high image resolution in both visible and infrared light wavelengths is the motivation of the present invention.

The present invention mitigates and/or obviates the aforementioned disadvantages.

SUMMARY

The primary objective of the present invention is to provide an optical lens assembly and photographing module. When a specific condition is satisfied, the optical lens assembly of the present invention has the image quality with high image resolution in both visible and infrared light wavelengths, and can achieve the effects of thinning and ultra-wide field of view.

In addition, when the lenses are made of glass, the optical lens assembly of the present invention can be used at more extreme temperatures.

Therefore, an optical lens assembly in accordance with the present invention comprises, in order from an object side to an image side: a first lens with negative refractive power, comprising an object-side surface and an image-side surface, the object-side surface of the first lens being convex near an optical axis and the image-side surface of the first lens being concave near the optical axis; a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric; a third lens with positive refractive power, comprising an object-side surface and an image-side surface, the image-side surface of the third lens being convex near the optical axis, and at least one of the object-side surface and the image-side surface of the third lens being aspheric; a stop; a fourth lens with positive refractive power, comprising an object-side surface and an image-side surface, the object-side surface of the fourth lens being convex near the optical axis and the image-side surface of the fourth lens being convex near the optical axis, and at least one of the object-side surface and the image-side surface of the fourth lens being aspheric; a fifth lens with negative refractive power, comprising an object-side surface and an image-side surface, the object-side surface of the fifth lens being concave near the optical axis and the image-side surface of the fifth lens being concave near the optical axis, and the object-side surface and the image-side surface of the fifth lens being aspheric; a sixth lens with positive refractive power, comprising an object-side surface and an image-side surface, the object-side surface of the sixth lens being convex near the optical axis and the image-side surface of the sixth lens being convex near the optical axis; and a seventh lens with negative refractive power, comprising an object-side surface and an image-side surface, the object-side surface of the seventh lens being convex near the optical axis and the image-side surface of the seventh lens being concave near the optical axis, and at least one of the object-side surface and the image-side surface of the seventh lens being aspheric.

Wherein a focal length of the first lens is f1, a focal length of the sixth lens is f6, and following condition is satisfied: $-5.74 < f1/f6 < -1.83$. Preferably, following condition can be satisfied: $-4.78 < f1/f6 < -2.29$.

Preferably, the optical lens assembly has a total of seven lenses with refractive power.

The present invention has the following effect: if the above seven lenses with refractive power satisfy the condition $-5.74 < f1/f6 < -1.83$, it is favorable to reduce the impact of environmental temperature on the lens assembly and balance the distributing of the refractive power of the optical lens assembly, which can correct the aberration and reduce the sensitivity.

Preferably, when the first lens and/or the sixth lens are made of glass, the optical lens assembly of the present invention can be used at more extreme temperatures.

Preferably, a focal length of the optical lens assembly is f, the focal length of the first lens is f1, and following condition is satisfied: $-0.34 < f/f1 < -0.1$, so that the ratio of the focal length of the first lens to that of the lens assembly can enhance its wide-field of view characteristic, so as to provide a larger field of view and maintain the illuminance of the lens assembly.

Preferably, a focal length of the fifth lens is f5, a focal length of the seventh lens is f7, and following condition is satisfied: $0.11 < f5/f7 < 0.71$, which is favorable to reduce the impact of the manufacturing tolerance of the sixth lens.

Preferably, the focal length of the fifth lens is f5, the focal length of the sixth lens is f6, the focal length of the seventh lens is f7, and following condition is satisfied: $0.44\ \text{mm}^{-1} < f7/(f5*f6) < 4.06\ \text{mm}^{-1}$, so that the distribution of the refractive power of the lens assembly will be appropriate, which can reduce the focal offset of the lens assembly in both visible and infrared light wavelengths.

Preferably, the focal length of the fifth lens is f5, a radius of curvature of the image-side surface of the fifth lens is R10, a central thickness of the fifth lens along the optical axis is CT5, and following condition is satisfied: $-4.82\ \text{mm}^{-1} < f5/(R10*CT5) < -2.04\ \text{mm}^{-1}$, which is favorable to achieve a proper balance between the lens formability and the refractive power of the fifth lens.

Preferably, a central thickness of the first lens along the optical axis is CT1, a central thickness of the second lens along the optical axis is CT2, a radius of curvature of the image-side surface of the first lens is R2, a radius of curvature of the image-side surface of the second lens is R4, and following condition is satisfied: $0.17\ \text{mm}^{-1} < (CT1+$ CT2)/(R2*R4)<1.05 mm$^{-1}$, so as to provide a large field of view and obtain better lens formability.

Preferably, a focal length of the third lens is f3, the focal length of the fifth lens is f5, the focal length of the seventh lens is f7, and following condition is satisfied: 0.3 mm$^{-1}$<f3/(f5*f7)<1.58 mm$^{-1}$, so that the distribution of the refractive power of the lens assembly will be appropriate, it will be favorable to correct the aberration of the lens assembly and improve the image quality.

Preferably, a focal length of the second lens is f2, a focal length of the fourth lens is f4, the focal length of the sixth lens is f6, and following condition is satisfied: −1.46 mm$^{-1}$<f2/(f4*f6)<−0.58 mm$^{-1}$, so that the distribution of the refractive power of the lens assembly will be appropriate, it will be favorable to correct the aberration of the lens assembly and improve the image quality.

Preferably, a radius of curvature of the object-side surface of the seventh lens is R13, a radius of curvature of the image-side surface of the seventh lens is R14, the focal length of the seventh lens is f7, and following condition is satisfied: −2.27 mm$^{-1}$<R13/(R14*f7)<−0.18 mm$^{-1}$, which can improve the ability of the seventh lens to correct the aberration of the lens assembly and adjust the angle of chief ray corresponding to the image plane.

Preferably, the focal length of the seventh lens is f7, a central thickness of the seventh lens along the optical axis is CT7, the radius of curvature of the image-side surface of the seventh lens is R14, and following condition is satisfied: −2.19 mm$^{-1}$<f7*CT7/R14<−0.62 mm$^{-1}$, which is favorable to achieve a proper balance between the lens formability and the refractive power of the seventh lens.

Preferably, the focal length of the fourth lens is f4, the focal length of the fifth lens is f5, a radius of curvature of the object-side surface of the fourth lens is R7, a radius of curvature of the image-side surface of the fourth lens is R8, the radius of curvature of the image-side surface of the fifth lens is R10, and following condition is satisfied: 0.34 mm$^{-1}$<(R10*f5)/(R7*R8*f4)<1.08 mm$^{-1}$, so that the fourth lens is in good cooperation with the fifth lens to improve the ghost image.

Preferably, a radius of curvature of the object-side surface of the first lens is R1, the radius of curvature of the image-side surface of the first lens is R2, and following condition is satisfied: 0.26<R2/R1<0.56, so as to reduce the impact of manufacturing tolerance on image quality and maintain better lens formability.

A photographing module in accordance with the present invention comprises a lens barrel, an optical lens assembly disposed in the lens barrel, and an image sensor disposed on an image plane of the optical lens assembly.

Wherein the optical lens assembly, in order from an object side to an image side, comprising: a first lens with negative refractive power, comprising an object-side surface and an image-side surface, the object-side surface of the first lens being convex near an optical axis and the image-side surface of the first lens being concave near the optical axis; a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric; a third lens with positive refractive power, comprising an object-side surface and an image-side surface, the image-side surface of the third lens being convex near the optical axis, and at least one of the object-side surface and the image-side surface of the third lens being aspheric; a stop; a fourth lens with positive refractive power, comprising an object-side surface and an image-side surface, the object-side surface of the fourth lens being convex near the optical axis and the image-side surface of the fourth lens being convex near the optical axis, and at least one of the object-side surface and the image-side surface of the fourth lens being aspheric; a fifth lens with negative refractive power, comprising an object-side surface and an image-side surface, the object-side surface of the fifth lens being concave near the optical axis and the image-side surface of the fifth lens being concave near the optical axis, and the object-side surface and the image-side surface of the fifth lens being aspheric; a sixth lens with positive refractive power, comprising an object-side surface and an image-side surface, the object-side surface of the sixth lens being convex near the optical axis and the image-side surface of the sixth lens being convex near the optical axis; and a seventh lens with negative refractive power, comprising an object-side surface and an image-side surface, the object-side surface of the seventh lens being convex near the optical axis and the image-side surface of the seventh lens being concave near the optical axis, and at least one of the object-side surface and the image-side surface of the seventh lens being aspheric.

Wherein a focal length of the first lens is f1, a focal length of the sixth lens is f6, and following condition is satisfied: −5.74<f1/f6<−1.83. Preferably, following condition can be satisfied: −4.78<f1/f6<−2.29.

Preferably, the optical lens assembly has a total of seven lenses with refractive power.

The present invention has the following effect: if the above seven lenses with refractive power satisfy the condition −5.74<f1/f6<−1.83, it is favorable to reduce the impact of environmental temperature on the lens assembly and balance the distributing of the refractive power of the optical lens assembly, which can correct the aberration and reduce the sensitivity.

Preferably, when the first lens and/or the sixth lens are made of glass, the optical lens assembly of the present invention can be used at more extreme temperatures.

Preferably, a focal length of the optical lens assembly is f, the focal length of the first lens is f1, and following condition is satisfied: −0.34<f/f1<−0.1, so that the ratio of the focal length of the first lens to that of the lens assembly can enhance its wide-field of view characteristic, so as to provide a larger field of view and maintain the illuminance of the lens assembly.

Preferably, a focal length of the fifth lens is f5, a focal length of the seventh lens is f7, and following condition is satisfied: 0.11<f5/f7<0.71, which is favorable to reduce the impact of the manufacturing tolerance of the sixth lens.

Preferably, the focal length of the fifth lens is f5, the focal length of the sixth lens is f6, the focal length of the seventh lens is f7, and following condition is satisfied: 0.44 mm$^{-1}$<f7/(f5*f6)<4.06 mm$^{-1}$, so that the distribution of the refractive power of the lens assembly will be appropriate, which can reduce the focal offset of the lens assembly in both visible and infrared light wavelengths.

Preferably, the focal length of the fifth lens is f5, a radius of curvature of the image-side surface of the fifth lens is R10, a central thickness of the fifth lens along the optical axis is CT5, and following condition is satisfied: −4.82 mm$^{-1}$<f5/(R10*CT5)<−2.04 mm$^{-1}$, which is favorable to achieve a proper balance between the lens formability and the refractive power of the fifth lens.

Preferably, a central thickness of the first lens along the optical axis is CT1, a central thickness of the second lens along the optical axis is CT2, a radius of curvature of the image-side surface of the first lens is R2, a radius of curvature of the image-side surface of the second lens is R4, and following condition is satisfied: $0.17 \text{ mm}^{-1} < (CT1+CT2)/(R2*R4) < 1.05 \text{ mm}^{-1}$, so as to provide a large field of view and obtain better lens formability.

Preferably, a focal length of the third lens is f3, the focal length of the fifth lens is f5, the focal length of the seventh lens is f7, and following condition is satisfied: $0.3 \text{ mm}^{-1} < f3/(f5*f7) < 1.58 \text{ mm}^{-1}$, so that the distribution of the refractive power of the lens assembly will be appropriate, it will be favorable to correct the aberration of the lens assembly and improve the image quality.

Preferably, a focal length of the second lens is f2, a focal length of the fourth lens is f4, the focal length of the sixth lens is f6, and following condition is satisfied: $-1.46 \text{ mm}^{-1} < f2/(f4*f6) < -0.58 \text{ mm}^{-1}$, so that the distribution of the refractive power of the lens assembly will be appropriate, it will be favorable to correct the aberration of the lens assembly and improve the image quality.

Preferably, a radius of curvature of the object-side surface of the seventh lens is R13, a radius of curvature of the image-side surface of the seventh lens is R14, the focal length of the seventh lens is f7, and following condition is satisfied: $-2.27 \text{ mm}^{-1} < R13/(R14*f7) < -0.18 \text{ mm}^{-1}$, which can improve the ability of the seventh lens to correct the aberration of the lens assembly and adjust the angle of chief ray corresponding to the image plane.

Preferably, the focal length of the seventh lens is f7, a central thickness of the seventh lens along the optical axis is CT7, the radius of curvature of the image-side surface of the seventh lens is R14, and following condition is satisfied: $-2.19 \text{ mm} < f7*CT7/R14 < -0.62 \text{ mm}$, which is favorable to achieve a proper balance between the lens formability and the refractive power of the seventh lens.

Preferably, the focal length of the fourth lens is f4, the focal length of the fifth lens is f5, a radius of curvature of the object-side surface of the fourth lens is R7, a radius of curvature of the image-side surface of the fourth lens is R8, the radius of curvature of the image-side surface of the fifth lens is R10, and following condition is satisfied: $0.34 \text{ mm}^{-1} < (R10*f5)/(R7*R8*f4) < 1.08 \text{ mm}^{-1}$, so that the fourth lens is in good cooperation with the fifth lens to improve the ghost image.

Preferably, a radius of curvature of the object-side surface of the first lens is R1, the radius of curvature of the image-side surface of the first lens is R2, and following condition is satisfied: $0.26 < R2/R1 < 0.56$, so as to reduce the impact of manufacturing tolerance on image quality and maintain better lens formability.

Another photographing module in accordance with the present invention comprises a lens barrel, an optical lens assembly disposed in the lens barrel, and an image sensor disposed on an image plane of the optical lens assembly.

The optical lens assembly comprises, in order from an object side to an image side: a first lens with negative refractive power, comprising an object-side surface and an image-side surface, the object-side surface of the first lens being convex near an optical axis and the image-side surface of the first lens being concave near the optical axis; a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric; a third lens with positive refractive power, comprising an object-side surface and an image-side surface, the image-side surface of the third lens being convex near the optical axis, and at least one of the object-side surface and the image-side surface of the third lens being aspheric; a stop; a fourth lens with positive refractive power, comprising an object-side surface and an image-side surface, the object-side surface of the fourth lens being convex near the optical axis and the image-side surface of the fourth lens being convex near the optical axis, and at least one of the object-side surface and the image-side surface of the fourth lens being aspheric; a fifth lens with negative refractive power, comprising an object-side surface and an image-side surface, the object-side surface of the fifth lens being concave near the optical axis and the image-side surface of the fifth lens being concave near the optical axis, and at least one of the object-side surface and the image-side surface of the fifth lens being aspheric; a sixth lens with positive refractive power, comprising an object-side surface and an image-side surface, the object-side surface of the sixth lens being convex near the optical axis and the image-side surface of the sixth lens being convex near the optical axis; and a seventh lens with negative refractive power, comprising an object-side surface and an image-side surface, the object-side surface of the seventh lens being convex near the optical axis and the image-side surface of the seventh lens being concave near the optical axis, and at least one of the object-side surface and the image-side surface of the seventh lens being aspheric.

Preferably, a distance from the object-side surface of the first lens to the image plane along the optical axis is TL, a radius of curvature of the image-side surface of the second lens is R4, half of a diagonal length of an effective pixel area of the image sensor is IMH, and following condition is satisfied: $2.7 \text{ mm} < TL*R4/IMH < 9.23 \text{ mm}$. Preferably, following condition can be satisfied: $3.37 \text{ mm} < TL*R4/IMH < 7.69 \text{ mm}$.

Preferably, the optical lens assembly has a total of seven lenses with refractive power.

The present invention has the following effect: if the above seven lenses with refractive power satisfy the condition $2.7 \text{ mm} < TL*R4/IMH < 9.23 \text{ mm}$, it is favorable to achieve a proper balance between miniaturization and the effective pixel area.

Preferably, when the first lens and/or the sixth lens are made of glass, the optical lens assembly of the present invention can be used at more extreme temperatures.

Preferably, a focal length of the first lens is f1, a focal length of the sixth lens is f6, and following condition is satisfied: $-5.74 < f1/f6 < -1.83$, which is favorable to reduce the impact of environmental temperature on the lens assembly and balance the distributing of the refractive power of the optical lens assembly, which can correct the aberration and reduce the sensitivity.

Preferably, a focal length of the optical lens assembly is f, the focal length of the first lens is f1, and following condition is satisfied: $-0.34 < f/f1 < -0.1$, so that the ratio of the focal length of the first lens to that of the lens assembly can enhance its wide-field of view characteristic, so as to provide a larger field of view and maintain the illuminance of the lens assembly.

Preferably, a focal length of the fifth lens is f5, a focal length of the seventh lens is f7, and following condition is satisfied: $0.11 < f5/f7 < 0.71$, which is favorable to reduce the impact of the manufacturing tolerance of the sixth lens.

Preferably, the focal length of the fifth lens is f5, the focal length of the sixth lens is f6, the focal length of the seventh lens is f7, and following condition is satisfied: 0.44 mm$^{-1}$<f7/(f5*f6)<4.06 mm$^{-1}$, so that the distribution of the refractive power of the lens assembly will be appropriate, which can reduce the focus offset of the lens assembly in both visible and infrared light wavelengths.

Preferably, the focal length of the fifth lens is f5, a radius of curvature of the image-side surface of the fifth lens is R10, a central thickness of the fifth lens along the optical axis is CT5, and following condition is satisfied: −4.82 mm$^{-1}$<f5/(R10*CT5)<−2.04 mm$^{-1}$, which is favorable to achieve a proper balance between the lens formability and the refractive power of the fifth lens.

Preferably, a central thickness of the first lens along the optical axis is CT1, a central thickness of the second lens along the optical axis is CT2, a radius of curvature of the image-side surface of the first lens is R2, the radius of curvature of the image-side surface of the second lens is R4, and following condition is satisfied: 0.17 mm$^{-1}$<(CT1+CT2)/(R2*R4)<1.05 mm$^{-1}$, so as to provide a large field of view and obtain better lens formability.

Preferably, a focal length of the third lens is f3, the focal length of the fifth lens is f5, the focal length of the seventh lens is f7, and following condition is satisfied: 0.3 mm$^{-1}$<f3/(f5*f7)<1.58 mm$^{-1}$, so that the distribution of the refractive power of the lens assembly will be appropriate, it will be favorable to correct the aberration of the lens assembly and improve the image quality.

Preferably, a focal length of the second lens is f2, a focal length of the fourth lens is f4, the focal length of the sixth lens is f6, and following condition is satisfied: −1.46 mm$^{-1}$<f2/(f4*f6)<−0.58 mm$^{-1}$, so that the distribution of the refractive power of the lens assembly will be appropriate, it will be favorable to correct the aberration of the lens assembly and improve the image quality.

Preferably, a radius of curvature of the object-side surface of the seventh lens is R13, a radius of curvature of the image-side surface of the seventh lens is R14, the focal length of the seventh lens is f7, and following condition is satisfied: −2.27 mm$^{-1}$<R13/(R14*f7)<−0.18 mm$^{-1}$, which can improve the ability of the seventh lens to correct the aberration of the lens assembly and adjust the angle of chief ray corresponding to the image plane.

Preferably, the focal length of the seventh lens is f7, a central thickness of the seventh lens along the optical axis is CT7, the radius of curvature of the image-side surface of the seventh lens is R14, and following condition is satisfied: −2.19 mm<f7*CT7/R14<−0.62 mm, which is favorable to achieve a proper balance between the lens formability and the refractive power of the seventh lens.

Preferably, the focal length of the fourth lens is f4, the focal length of the fifth lens is f5, a radius of curvature of the object-side surface of the fourth lens is R7, a radius of curvature of the image-side surface of the fourth lens is R8, the radius of curvature of the image-side surface of the fifth lens is R10, and following condition is satisfied: 0.34 mm$^{-1}$<(R10*f5)/(R7*R8*f4)<1.08 mm$^{-1}$, so that the fourth lens is in good cooperation with the fifth lens to improve the ghost image.

Preferably, a radius of curvature of the object-side surface of the first lens is R1, the radius of curvature of the image-side surface of the first lens is R2, and following condition is satisfied: 0.26<R2/R1<0.56, so as to reduce the impact of manufacturing tolerance on image quality and maintain better lens formability.

For each of the above optical lens assemblies or the photographing modules, wherein the focal length of the optical lens assembly is f, and following condition is satisfied: 0.76 mm<f<2.42 mm.

For each of the above optical lens assemblies or the photographing modules, wherein the optical lens assembly has a maximum view angle (field of view) FOV, and following condition is satisfied: 143.92 degrees<FOV<225.41 degrees. Preferably, following condition can be satisfied: 161.91 degrees<FOV<206.63 degrees.

The present invention will be presented in further details from the following descriptions with the accompanying drawings, which show, for purpose of illustrations only, the preferred embodiments in accordance with the present invention.

DETAILED DESCRIPTION

Figure 1A:
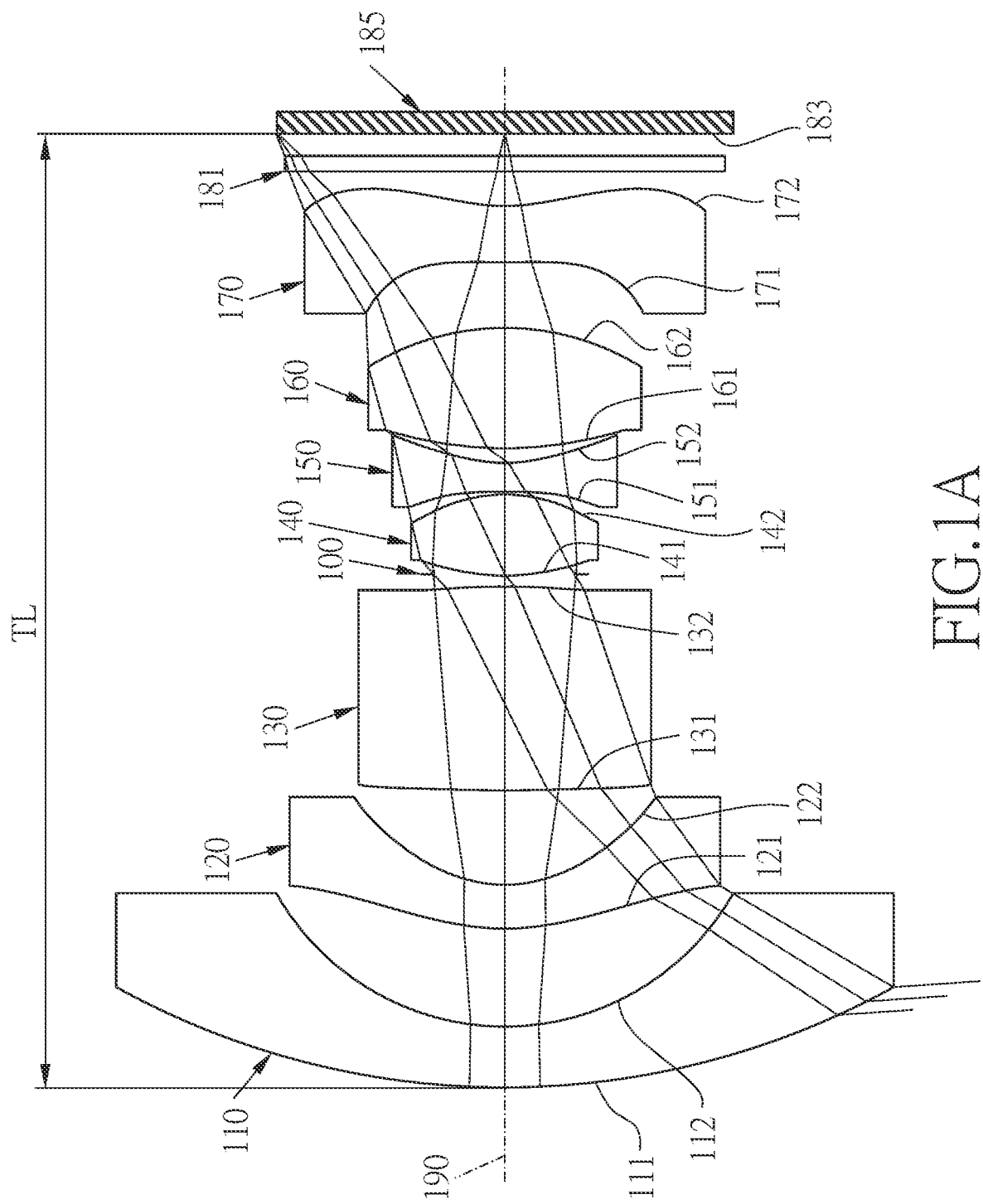
FIG. 1A shows an optical lens assembly in accordance with a first embodiment of the present invention.
Figure 1B:
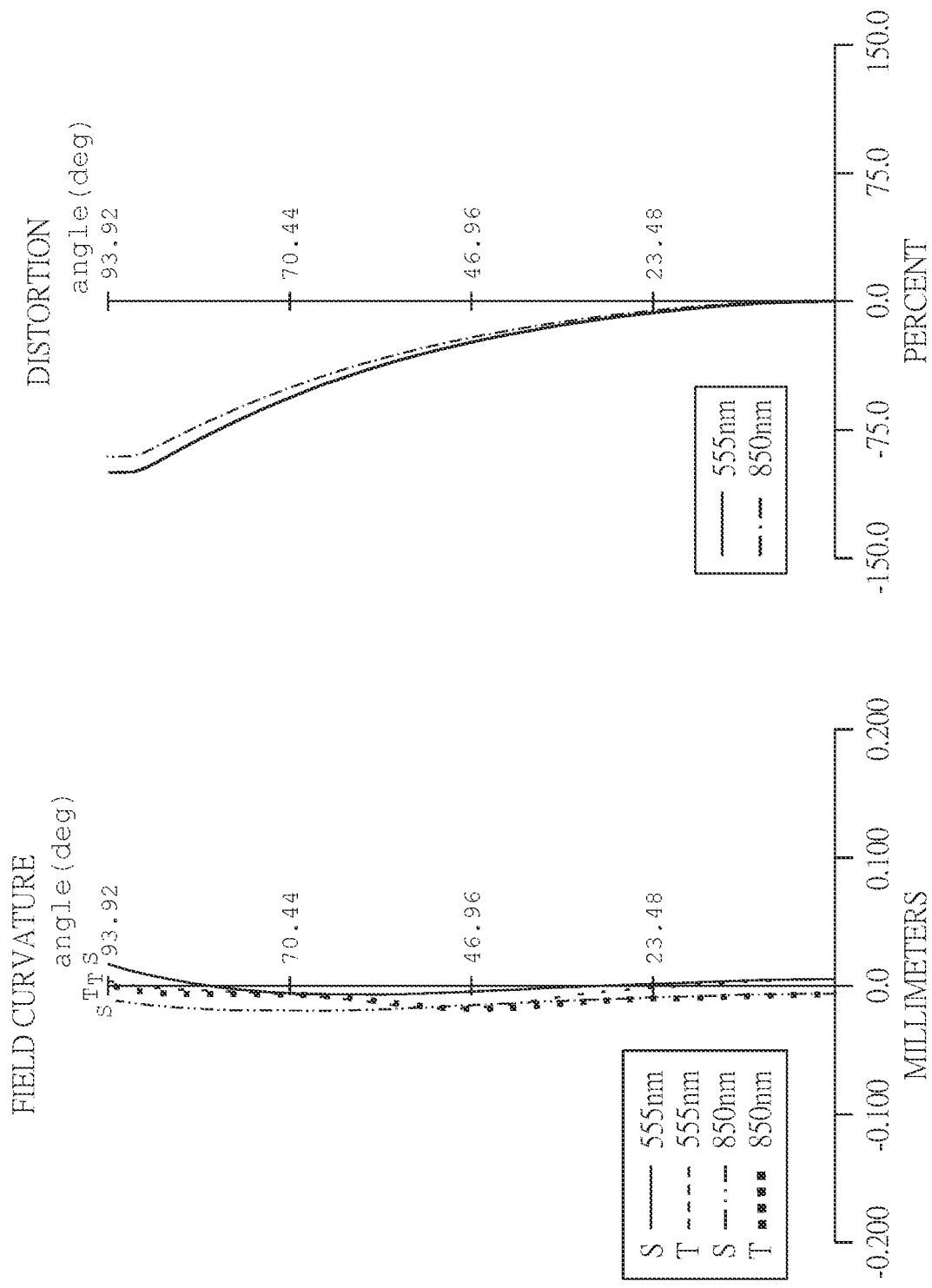
FIG. 1B shows the field curvature curve and the distortion curve of the first embodiment of the present invention, showing the state of the field curvature curve and the distortion curve in both visible and infrared light wavelengths.

Referring to FIGS. 1A and 1B, FIG. 1A shows an optical lens assembly in accordance with a first embodiment of the present invention, and FIG. 1B shows, in order from left to right, the field curvature curve and the distortion curve of the first embodiment of the present invention, showing the state of the field curvature curve and the distortion curve in both visible and infrared light wavelengths. An optical lens assembly in accordance with the first embodiment of the present invention comprises, in order from an object side to an image side along an optical axis 190: a first lens 110, a second lens 120, a third lens 130, a stop 100, a fourth lens 140, a fifth lens 150, a sixth lens 160, a seventh lens 170, a filter 181, and an image plane 183. The optical lens assembly is provided with an image sensor 185. Wherein the optical lens assembly has a total of seven lenses with refractive power, but not limited to this. The image sensor 185 is disposed on the image plane 183.

The first lens 110 with negative refractive power, comprising an object-side surface 111 and an image-side surface 112, the object-side surface 111 of the first lens 110 being convex near the optical axis 190 and the image-side surface 112 of the first lens 110 being concave near the optical axis 190, and the first lens 110 is made of glass material.

The second lens 120 with negative refractive power, comprising an object-side surface 121 and an image-side surface 122, the object-side surface 121 of the second lens 120 being convex near the optical axis 190 and the image-side surface 122 of the second lens 120 being concave near the optical axis 190, the object-side surface 121 and the image-side surface 122 of the second lens 120 are aspheric, and the second lens 120 is made of plastic material.

The third lens 130 with positive refractive power, comprising an object-side surface 131 and an image-side surface 132, the object-side surface 131 of the third lens 130 being convex near the optical axis 190 and the image-side surface 132 of the third lens 130 being convex near the optical axis 190, the object-side surface 131 and the image-side surface 132 of the third lens 130 are aspheric, and the third lens 130 is made of plastic material.

The fourth lens 140 with positive refractive power, comprising an object-side surface 141 and an image-side surface 142, the object-side surface 141 of the fourth lens 140 being convex near the optical axis 190 and the image-side surface 142 of the fourth lens 140 being convex near the optical axis 190, the object-side surface 141 and the image-side surface 142 of the fourth lens 140 are aspheric, and the fourth lens 140 is made of plastic material.

The fifth lens 150 with negative refractive power, comprising an object-side surface 151 and an image-side surface 152, the object-side surface 151 of the fifth lens 150 being concave near the optical axis 190 and the image-side surface 152 of the fifth lens 150 being concave near the optical axis 190, the object-side surface 151 and the image-side surface 152 of the fifth lens 150 are aspheric, and the fifth lens 150 is made of plastic material.

The sixth lens 160 with positive refractive power, comprising an object-side surface 161 and an image-side surface 162, the object-side surface 161 of the sixth lens 160 being convex near the optical axis 190 and the image-side surface 162 of the sixth lens 160 being convex near the optical axis 190, and the sixth lens 160 is made of glass material.

The seventh lens 170 with negative refractive power, comprising an object-side surface 171 and an image-side surface 172, the object-side surface 171 of the seventh lens 170 being convex near the optical axis 190 and the image-side surface 172 of the seventh lens 170 being concave near the optical axis 190, the object-side surface 171 and the image-side surface 172 of the seventh lens 170 are aspheric, and the seventh lens 170 is made of plastic material.

The filter 181 made of glass is located between the seventh lens 170 and the image plane 183 and has no influence on the focal length of the optical lens assembly. The present embodiment selects an IR-Cut Filter Removable (ICR), which is a set of automatically switchable filters. The switch of the filter determines whether the image sensor can receive the infrared light wavelength, and the timing of switching the filter depends on the visible light intensity detected by an image sensor of a photographing lens, but not limited to this. A filter that allows the visible light wavelength, the infrared light wavelength or both the visible and infrared light wavelengths to pass may be selected.

The equation for the aspheric surface profiles of the respective lenses of the first embodiment is expressed as follows:

$$z(h) = \frac{ch^2}{1 + [1 - (k+1)c^2h^2]^{0.5}} + \sum (A_i) \cdot (h^i)$$

wherein:
z represents the value of a reference position with respect to a vertex of the surface of a lens and a position with a height h along the optical axis 190;
c represents a paraxial curvature equal to 1/R (R: a paraxial radius of curvature);
h represents a vertical distance from the point on the curve of the aspheric surface to the optical axis 190;
k represents the conic constant;
$A_i$, . . .: represent the i-order aspheric coefficients.

In the first embodiment of the present optical lens assembly, a focal length of the optical lens assembly is f, a f-number of the optical lens assembly is Fno, the optical lens assembly has a maximum view angle FOV, an entrance pupil diameter of the optical lens assembly is EPD, and following conditions are satisfied: f=2.01 mm; Fno=2.00; FOV=187.85 degrees; and EPD=0.95 mm.

In the first embodiment of the present optical lens assembly, a focal length of the first lens 110 is f1, a focal length of the sixth lens 160 is f6, and following condition is satisfied: f1/f6=−2.29.

In the first embodiment of the present optical lens assembly, the focal length of the optical lens assembly is f, the focal length of the first lens 110 is f1, and following condition is satisfied: f/f1=−0.28.

In the first embodiment of the present optical lens assembly, a focal length of the fifth lens 150 is f5, a focal length of the seventh lens 170 is f7, and following condition is satisfied: f5/f7=0.59.

In the first embodiment of the present optical lens assembly, the focal length of the fifth lens 150 is f5, the focal length of the sixth lens 160 is f6, the focal length of the seventh lens 170 is f7, and following condition is satisfied: f7/(f5*f6)=0.54 $mm^{-1}$.

In the first embodiment of the present optical lens assembly, the focal length of the fifth lens 150 is f5, a radius of curvature of the image-side surface 152 of the fifth lens 150 is R10, a central thickness of the fifth lens 150 along the optical axis 190 is CT5, and following condition is satisfied: f5/(R10*CT5)=−3.48 $mm^{-1}$.

In the first embodiment of the present optical lens assembly, a central thickness of the first lens 110 along the optical axis 190 is CT1, a central thickness of the second lens 120 along the optical axis 190 is CT2, a radius of curvature of the image-side surface 112 of the first lens 110 is R2, a radius of curvature of the image-side surface 122 of the second lens 120 is R4, and following condition is satisfied: (CT1+CT2)/(R2*R4)=0.22 $mm^{-1}$.

In the first embodiment of the present optical lens assembly, a focal length of the third lens 130 is f3, the focal length of the fifth lens 150 is f5, the focal length of the seventh lens 170 is f7, and following condition is satisfied: f3/(f5*f7)=1.31 mm$^{-1}$.

In the first embodiment of the present optical lens assembly, a focal length of the second lens 120 is f2, a focal length of the fourth lens 140 is f4, the focal length of the sixth lens 160 is f6, and following condition is satisfied: f2/(f4*f6)=−1.21 mm$^{-1}$.

In the first embodiment of the present optical lens assembly, a radius of curvature of the object-side surface 171 of the seventh lens 170 is R13, a radius of curvature of the image-side surface 172 of the seventh lens 170 is R14, the focal length of the seventh lens 170 is f7, and following condition is satisfied: R13/(R14*f7)=−1.90 mm$^{-1}$.

In the first embodiment of the present optical lens assembly, the focal length of the seventh lens 170 is f7, a central thickness of the seventh lens 170 along the optical axis 190 is CT7, the radius of curvature of the image-side surface 172 of the seventh lens 170 is R14, and following condition is satisfied: f7*CT7/R14=−1.37 mm.

In the first embodiment of the present optical lens assembly, the focal length of the fourth lens 140 is f4, the focal length of the fifth lens 150 is f5, a radius of curvature of the object-side surface 141 of the fourth lens 140 is R7, a radius of curvature of the image-side surface 142 of the fourth lens 140 is R8, the radius of curvature of the image-side surface 152 of the fifth lens 150 is R10, and following condition is satisfied: (R10*f5)/(R7*R8*f4)=0.43 mm$^{-1}$.

In the first embodiment of the present optical lens assembly, a radius of curvature of the object-side surface 111 of the first lens 110 is R1, the radius of curvature of the image-side surface 112 of the first lens 110 is R2, and following condition is satisfied: R2/R1=0.33.

In the first embodiment of the present optical lens assembly, a distance from the object-side surface 111 of the first lens 110 to the image plane 183 along the optical axis 190 is TL, the radius of curvature of the image-side surface 122 of the second lens 120 is R4, half of a diagonal length of an effective pixel area of the image sensor 185 is IMH, and following condition is satisfied: TL*R4/IMH=7.69 mm.

The detailed optical data of the first embodiment is shown in table 1, and the aspheric surface data is shown in table 2.

TABLE 1

Embodiment 1 f(focal length) = 2.01 mm, Fno = 2.0, FOV = 187.85 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | Lens 1 | 10.802 | | 0.823 | glass | 1.773 | 49.6 | −7.15 |
| 2 | | 3.541 | | 1.325 | | | | |
| 3 | Lens 2 | 3.396 | (ASP) | 0.590 | plastic | 1.544 | 56.0 | −8.49 |
| 4 | | 1.839 | (ASP) | 1.279 | | | | |
| 5 | Lens 3 | 23.556 | (ASP) | 2.753 | plastic | 1.636 | 24.0 | 14.70 |
| 6 | | −14.933 | (ASP) | 0.168 | | | | |
| 7 | stop | infinity | | −0.022 | | | | |
| 8 | Lens 4 | 2.643 | (ASP) | 1.103 | plastic | 1.544 | 56.0 | 2.24 |
| 9 | | −1.938 | (ASP) | 0.036 | | | | |
| 10 | Lens 5 | −13.081 | (ASP) | 0.388 | plastic | 1.636 | 24.0 | −2.57 |
| 11 | | 1.899 | (ASP) | 0.198 | | | | |
| 12 | Lens 6 | 5.342 | | 1.629 | glass | 1.729 | 54.7 | 3.12 |
| 13 | | −3.474 | | 0.890 | | | | |
| 14 | Lens 7 | 19.944 | (ASP) | 0.756 | plastic | 1.636 | 24.0 | −4.36 |
| 15 | | 2.412 | (ASP) | 0.467 | | | | |
| 16 | filter | infinity | | 0.210 | glass | 1.517 | 64.2 | |
| 17 | | infinity | | 0.300 | | | | |
| 18 | Image plane | infinity | | — | | | | |

TABLE 2

Aspheric Coefficients

| surface | 3 | 4 | 5 | 6 | 8 |
|---|---|---|---|---|---|
| K: | −4.6287E+00 | −1.0475E+00 | 1.1429E+02 | 1.4317E+01 | −9.8409E+00 |
| A2: | 0.0000E+00 | 0.0000E+00 | 0.0000E+00 | 0.0000E+00 | 0.0000E+00 |
| A4: | −3.5708E−03 | −3.6519E−03 | −3.6943E−03 | −4.1687E−02 | 6.7118E−03 |
| A6: | −3.9805E−05 | 3.7466E−03 | 1.9096E−04 | 5.1585E−02 | 1.8092E−02 |
| A8: | −1.3563E−05 | −1.4827E−03 | 1.9494E−04 | −3.1515E−02 | −1.5556E−02 |
| A10 | 2.7907E−06 | 4.7678E−04 | 1.9494E−04 | 1.4097E−02 | −1.7530E−03 |
| A12 | −4.8223E−08 | −5.0216E−05 | −2.2448E−05 | −3.7055E−03 | 6.8534E−03 |
| A14 | −7.0445E−09 | −1.7204E−05 | 3.5509E−06 | 2.5455E−03 | 5.0094E−04 |
| A16 | −2.2455E−10 | 3.9686E−06 | −2.6300E−07 | −3.8611E−04 | −1.1059E−03 |
| surface | 9 | 10 | 11 | 14 | 15 |
| K: | −6.0900E+00 | 8.5511E+01 | −9.5454E+00 | −1.0849E+03 | −9.9502E+00 |
| A2: | 0.0000E+00 | 0.0000E+00 | 0.0000E+00 | 0.0000E+00 | 0.0000E+00 |
| A4: | −3.5605E−02 | −9.1372E−02 | 2.1798E−05 | −5.9878E−02 | −2.0340E−02 |

TABLE 2-continued

Aspheric Coefficients

| A6: | −4.1803E−02 | 2.8896E−02 | 4.2481E−03 | 4.9140E−03 | 2.5490E−03 |
|---|---|---|---|---|---|
| A8: | 3.8691E−02 | −6.7686E−03 | −6.6301E−04 | −3.4628E−04 | −2.4711E−04 |
| A10 | −8.1102E−03 | 3.4699E−03 | −1.2962E−04 | −4.2526E−04 | −9.2626E−07 |
| A12 | −3.3662E−03 | −1.7549E−04 | 4.8303E−05 | 2.9889E−05 | 3.3331E−07 |
| A14 | 2.9552E−04 | 1.9345E−04 | 3.3059E−05 | 2.0087E−05 | 1.3360E−07 |
| A16 | 1.2419E−03 | 1.1724E−04 | −9.7862E−06 | −5.1272E−06 | −1.5710E−08 |

The units of the radius of curvature, the thickness and the focal length in table 1 are expressed in mm, the surface numbers 0-18 represent the surfaces sequentially arranged from the object-side to the image-side along the optical axis, wherein surface 0 represents a gap between an object and the object-side surface 111 of the first lens 110 along the optical axis 190, surfaces 1, 3, 5, 8, 10, 12, 14, 16 are thicknesses of the first lens 110, the second lens 120, the third lens 130, the fourth lens 140, the fifth lens 150, the sixth lens 160, the seventh lens 170 and the filter 181 along the optical axis 190, respectively, surface 2 represents a gap between the first lens 110 and the second lens 120 along the optical axis 190, surface 4 represents a gap between the second lens 120 and the third lens 130 along the optical axis 190, surface 6 represents a gap between the third lens 130 and the stop 100 along the optical axis 190, surface 7 represents a gap between the stop 100 and the object-side surface 141 of the fourth lens 140 along the optical axis 190, the stop 100 is farther away from the object-side than the object-side surface 141 of the fourth lens 140, so it is expressed as a negative value, surface 9 represents a gap between the fourth lens 140 and the fifth lens 150 along the optical axis 190, surface 11 represents a gap between the fifth lens 150 and the sixth lens 160 along the optical axis 190, surface 13 represents a gap between the fifth lens 150 and the seventh lens 170 along the optical axis 190, surface 15 represents a gap between the seventh lens 170 and the filter 181 along the optical axis 190, surface 17 represents a gap between the filter 181 and the image plane 183 along the optical axis 190.

In table 2, k represents the conic coefficient of the equation of the aspheric surface profiles, and A2, A4, A6, A8, A10, A12, A14, A16: represent the high-order aspheric coefficients. The tables presented below for each embodiment are the corresponding schematic parameter and field curvature curves, and the definitions of the tables are the same as Table 1 and Table 2 of the first embodiment. Therefore, an explanation in this regard will not be provided again.

Figure 2A:
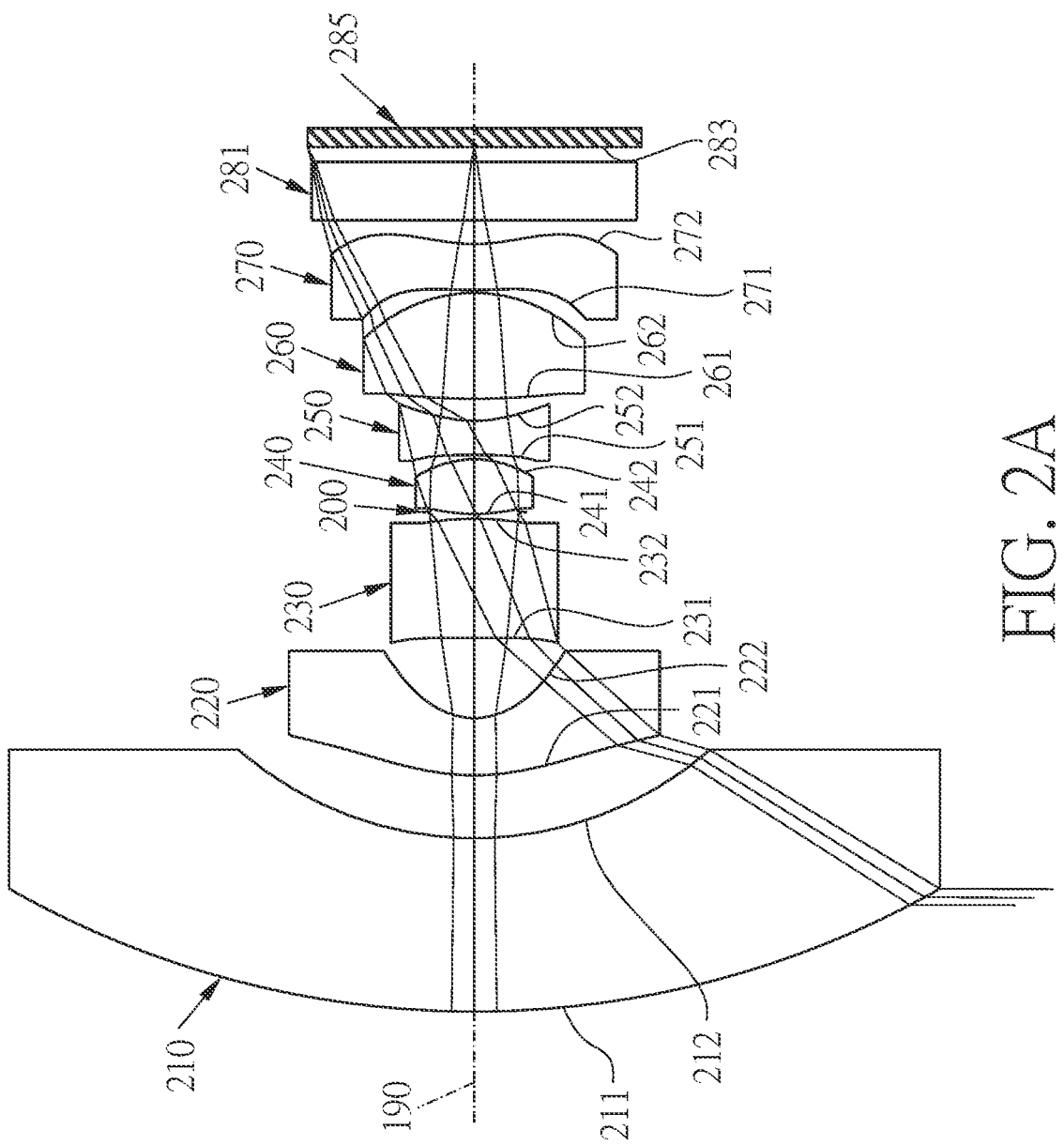
FIG. 2A shows an optical lens assembly in accordance with a second embodiment of the present invention.
Figure 2B:
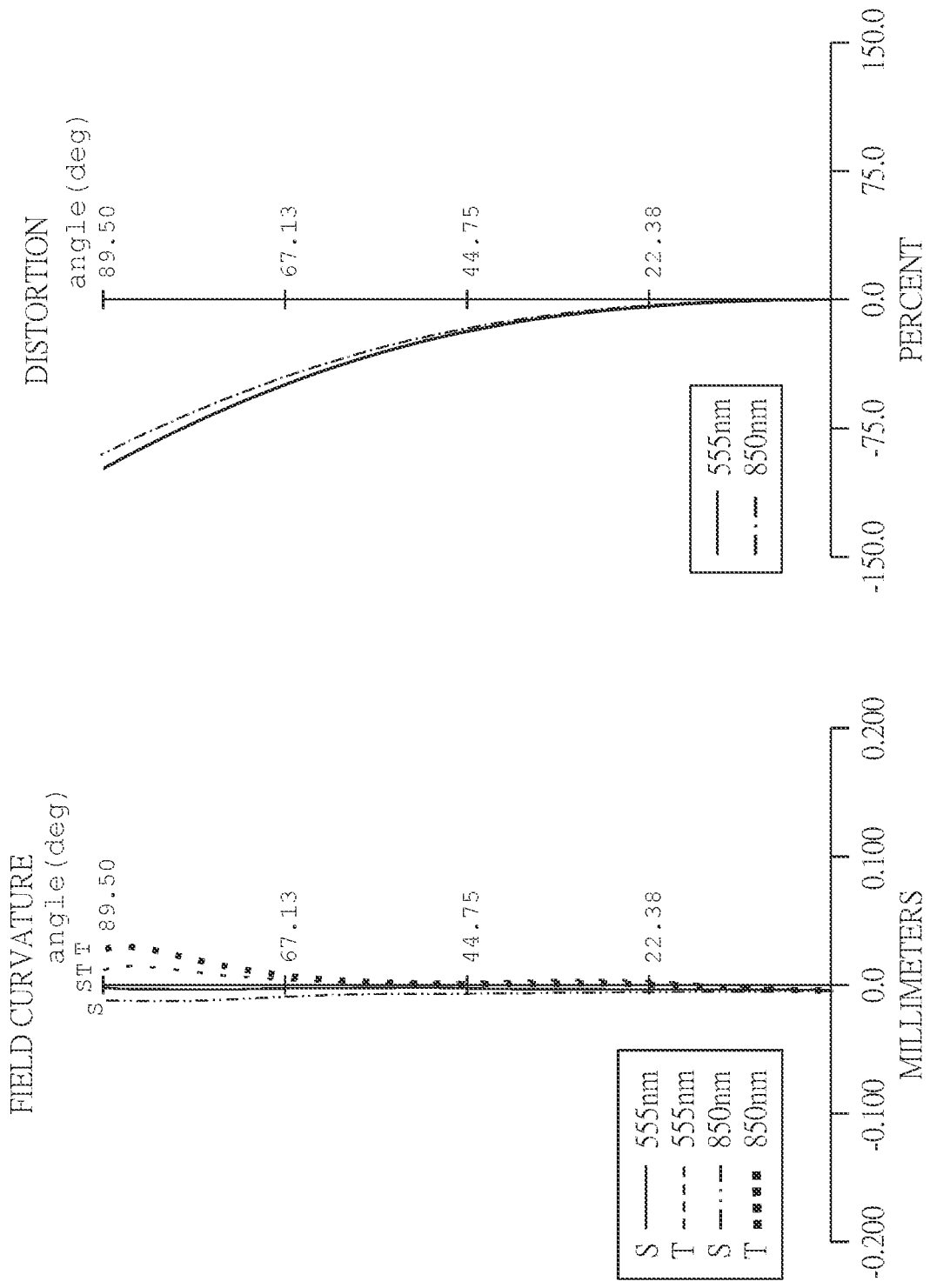
FIG. 2B shows the field curvature curve and the distortion curve of the second embodiment of the present invention, showing the state of the field curvature curve and the distortion curve in both visible and infrared light wavelengths.

Referring to FIGS. 2A and 2B, FIG. 2A shows an optical lens assembly in accordance with a second embodiment of the present invention, and FIG. 2B shows, in order from left to right, the field curvature curve and the distortion curve of the second embodiment of the present invention, showing the state of the field curvature curve and the distortion curve in both visible and infrared light wavelengths. An optical lens assembly in accordance with the second embodiment of the present invention comprises, in order from an object side to an image side along an optical axis 290: a first lens 210, a second lens 220, a third lens 230, a stop 200, a fourth lens 240, a fifth lens 250, a sixth lens 260, a seventh lens 270, a filter 281, and an image plane 283. The optical lens assembly is provided with an image sensor 285. Wherein the optical lens assembly has a total of seven lenses with refractive power, but not limited to this. The image sensor 285 is disposed on the image plane 283.

The first lens 210 with negative refractive power, comprising an object-side surface 211 and an image-side surface 212, the object-side surface 211 of the first lens 210 being convex near the optical axis 290 and the image-side surface 212 of the first lens 210 being concave near the optical axis 290, and the first lens 210 is made of glass material.

The second lens 220 with negative refractive power, comprising an object-side surface 221 and an image-side surface 222, the object-side surface 221 of the second lens 220 being convex near the optical axis 290 and the image-side surface 222 of the second lens 220 being concave near the optical axis 290, the object-side surface 221 and the image-side surface 222 of the second lens 220 are aspheric, and the second lens 220 is made of plastic material.

The third lens 230 with positive refractive power, comprising an object-side surface 231 and an image-side surface 232, the object-side surface 231 of the third lens 230 being convex near the optical axis 290 and the image-side surface 232 of the third lens 230 being convex near the optical axis 290, the object-side surface 231 and the image-side surface 232 of the third lens 230 are aspheric, and the third lens 230 is made of plastic material.

The fourth lens 240 with positive refractive power, comprising an object-side surface 241 and an image-side surface 242, the object-side surface 241 of the fourth lens 240 being convex near the optical axis 290 and the image-side surface 242 of the fourth lens 240 being convex near the optical axis 290, the object-side surface 241 and the image-side surface 242 of the fourth lens 240 are aspheric, and the fourth lens 240 is made of plastic material.

The fifth lens 250 with negative refractive power, comprising an object-side surface 251 and an image-side surface 252, the object-side surface 251 of the fifth lens 250 being concave near the optical axis 290 and the image-side surface 252 of the fifth lens 250 being concave near the optical axis 290, the object-side surface 251 and the image-side surface 252 of the fifth lens 250 are aspheric, and the fifth lens 250 is made of plastic material.

The sixth lens 260 with positive refractive power, comprising an object-side surface 261 and an image-side surface 262, the object-side surface 261 of the sixth lens 260 being convex near the optical axis 290 and the image-side surface 262 of the sixth lens 260 being convex near the optical axis 290, and the sixth lens 260 is made of glass material.

The seventh lens 270 with negative refractive power, comprising an object-side surface 271 and an image-side surface 272, the object-side surface 271 of the seventh lens 270 being convex near the optical axis 290 and the image-side surface 272 of the seventh lens 270 being concave near the optical axis 290, the object-side surface 271 and the image-side surface 272 of the seventh lens 270 are aspheric, and the seventh lens 270 is made of plastic material.

The filter 281 made of glass is located between the seventh lens 270 and the image plane 283 and has no influence on the focal length of the optical lens assembly. The present embodiment selects an IR-Cut Filter Removable (ICR), which is a set of automatically switchable filters. The switch of the filter determines whether the image sensor can receive the infrared light wavelength, and the timing of switching the filter depends on the visible light intensity detected by an image sensor of a photographing lens, but not limited to this. A filter that allows the visible light wavelength, the infrared light wavelength or both the visible and infrared light wavelengths to pass may be selected.

The detailed optical data of the second embodiment is shown in table 3, and the aspheric surface data is shown in table 4.

In the second embodiment, the equation of the aspheric surface profiles of the aforementioned lenses is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 1.16 | $(CT1 + CT2)/(R2 * R4)$ | 0.88 |
| EPD[mm] | 0.47 | $f3/(f5 * f7)$ | 0.81 |

TABLE 3

Embodiment 2 f(focal length) = 1.16 mm, Fno = 2.4, FOV = 179.9 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | Lens 1 | 9.888 | | 1.818 | glass | 1.773 | 49.6 | −8.95 |
| 2 | | 3.750 | | 0.661 | | | | |
| 3 | Lens 2 | 2.458 | (ASP) | 0.599 | plastic | 1.544 | 56.0 | −2.19 |
| 4 | | 0.735 | (ASP) | 0.846 | | | | |
| 5 | Lens 3 | 108.603 | (ASP) | 1.250 | plastic | 1.661 | 20.4 | 5.90 |
| 6 | | −4.064 | (ASP) | 0.069 | | | | |
| 7 | stop | infinity | | −0.019 | | | | |
| 8 | Lens 4 | 1.772 | (ASP) | 0.575 | plastic | 1.544 | 56.0 | 1.31 |
| 9 | | −1.060 | (ASP) | 0.044 | | | | |
| 10 | Lens 5 | −35.644 | (ASP) | 0.360 | plastic | 1.661 | 20.4 | −1.78 |
| 11 | | 1.235 | (ASP) | 0.235 | | | | |
| 12 | Lens 6 | 7.983 | | 1.107 | glass | 1.729 | 54.7 | 1.95 |
| 13 | | −1.636 | | 0.035 | | | | |
| 14 | Lens 7 | 5.409 | (ASP) | 0.480 | plastic | 1.661 | 20.4 | −4.09 |
| 15 | | 1.749 | (ASP) | 0.253 | | | | |
| 16 | filter | infinity | | 0.610 | glass | 1.517 | 64.2 | |
| 17 | | infinity | | 0.147 | | | | |
| 18 | Image plane | infinity | | — | | | | |

TABLE 4

Aspheric Coefficients

| surface | 3 | 4 | 5 | 6 | 8 |
|---|---|---|---|---|---|
| K: | −3.8345E+00 | −7.5782E−01 | 3.5003E+02 | 2.9433E+01 | −1.8470E+01 |
| A2: | 0.0000E+00 | 0.0000E+00 | 0.0000E+00 | 0.0000E+00 | 0.0000E+00 |
| A4: | −1.0446E−02 | 2.7400E−02 | −7.6238E−02 | −2.3055E−01 | 6.9957E−02 |
| A6: | −4.8168E−04 | 6.3032E−02 | 2.6687E−02 | 1.1902E+00 | 1.2927E−01 |
| A8: | −8.6884E−04 | −1.3087E−01 | 1.9208E−01 | −2.6349E+00 | −7.6226E−01 |
| A10 | 4.2689E−04 | 2.3784E−01 | 1.9208E−01 | 4.0790E+00 | 4.6282E−01 |
| A12 | −5.1852E−05 | −2.2797E−01 | −9.1248E−02 | −1.0659E+00 | −2.6007E−01 |
| A14 | 1.6985E−06 | 1.7697E−02 | 2.9971E−02 | 1.4524E+00 | 1.9331E+00 |
| A16 | 0.0000E+00 | 0.0000E+00 | 0.0000E+00 | 0.0000E+00 | 0.0000E+00 |

| surface | 9 | 10 | 11 | 14 | 15 |
|---|---|---|---|---|---|
| K: | −3.0565E+00 | −9.9904E+01 | −8.2396E+00 | −8.4961E+01 | −6.2486E+00 |
| A2: | 0.0000E+00 | 0.0000E+00 | 0.0000E+00 | 0.0000E+00 | 0.0000E+00 |
| A4: | −9.8075E−02 | −3.5040E−01 | 1.1503E−02 | −1.9959E−01 | −1.5029E−01 |
| A6: | −5.8603E−01 | 1.3787E−01 | 3.5331E−02 | −2.6054E−02 | 3.9303E−02 |
| A8: | 1.1496E+00 | −2.3625E−01 | 9.1308E−04 | 3.6438E−02 | −8.6875E−03 |
| A10 | −1.1148E+00 | 4.3830E−01 | −3.4285E−03 | −1.3240E−02 | 2.5260E−04 |
| A12 | −5.2729E−01 | 1.5883E−02 | −1.6462E−02 | −1.1609E−04 | 4.7960E−05 |
| A14 | 8.6845E−01 | −4.4920E−01 | 4.5765E−03 | −4.6953E−04 | 2.5092E−05 |
| A16 | 0.0000E+00 | 0.0000E+00 | 0.0000E+00 | 0.0000E+00 | 0.0000E+00 |

-continued

| Embodiment 2 | | | |
|---|---|---|---|
| Fno | 2.40 | f2/(f4 * f6) | −0.86 |
| FOV[deg.] | 179.90 | R13/(R14 * f7) | −0.76 |
| f1/f6 | −4.59 | f7 * CT7/R14 | −1.12 |
| f/f1 | −0.13 | (R10 *f5)/(R7 * R 8* f4) | 0.90 |
| f5/f7 | 0.44 | R2/R1 | 0.38 |
| f7/(f5 * f6) | 1.18 | TL*R4/IMH | 3.81 |
| f5/(R10 * CT5) | −4.01 | | |

Figure 3A:
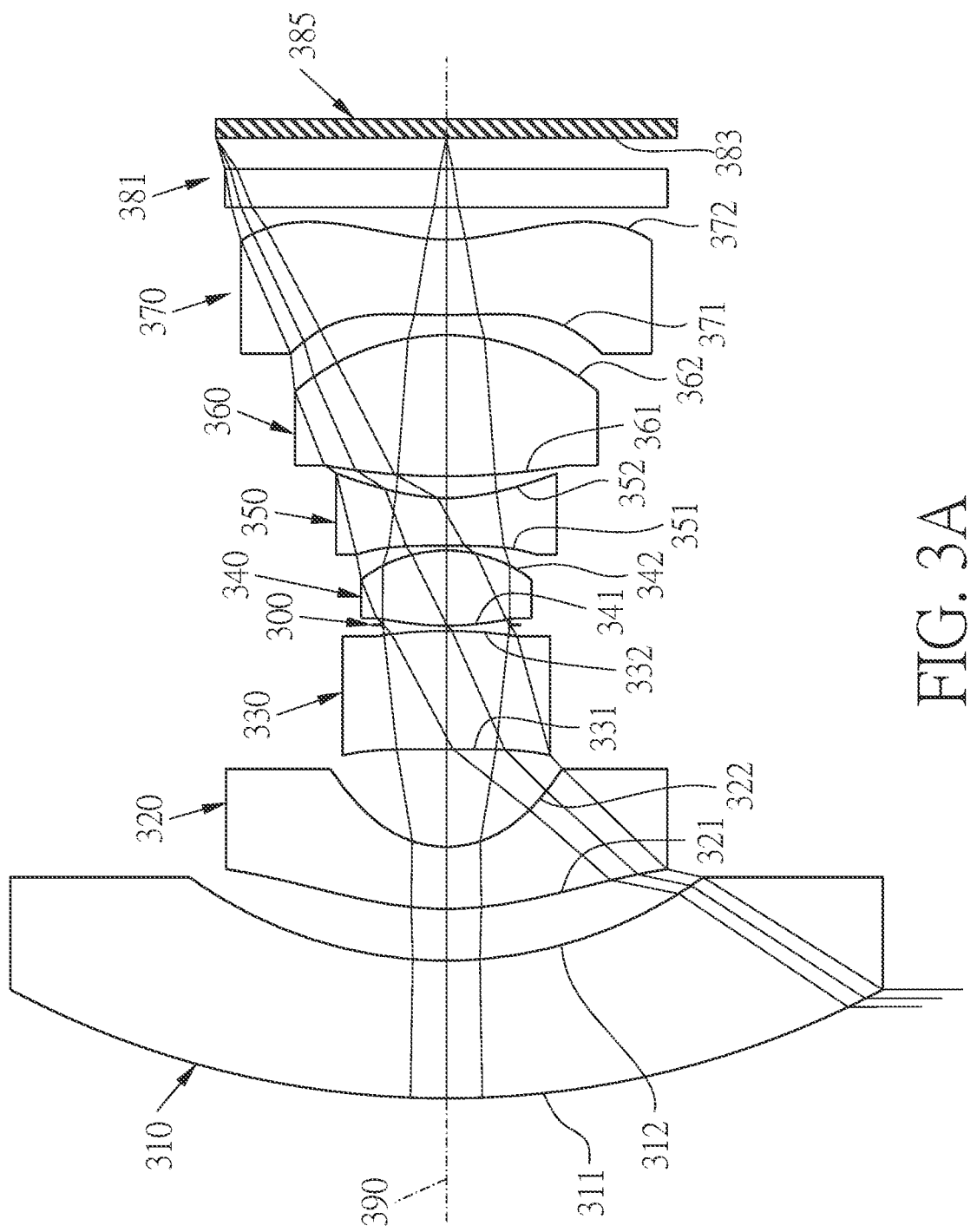
FIG. 3A shows an optical lens assembly in accordance with a third embodiment of the present invention.
Figure 3B:
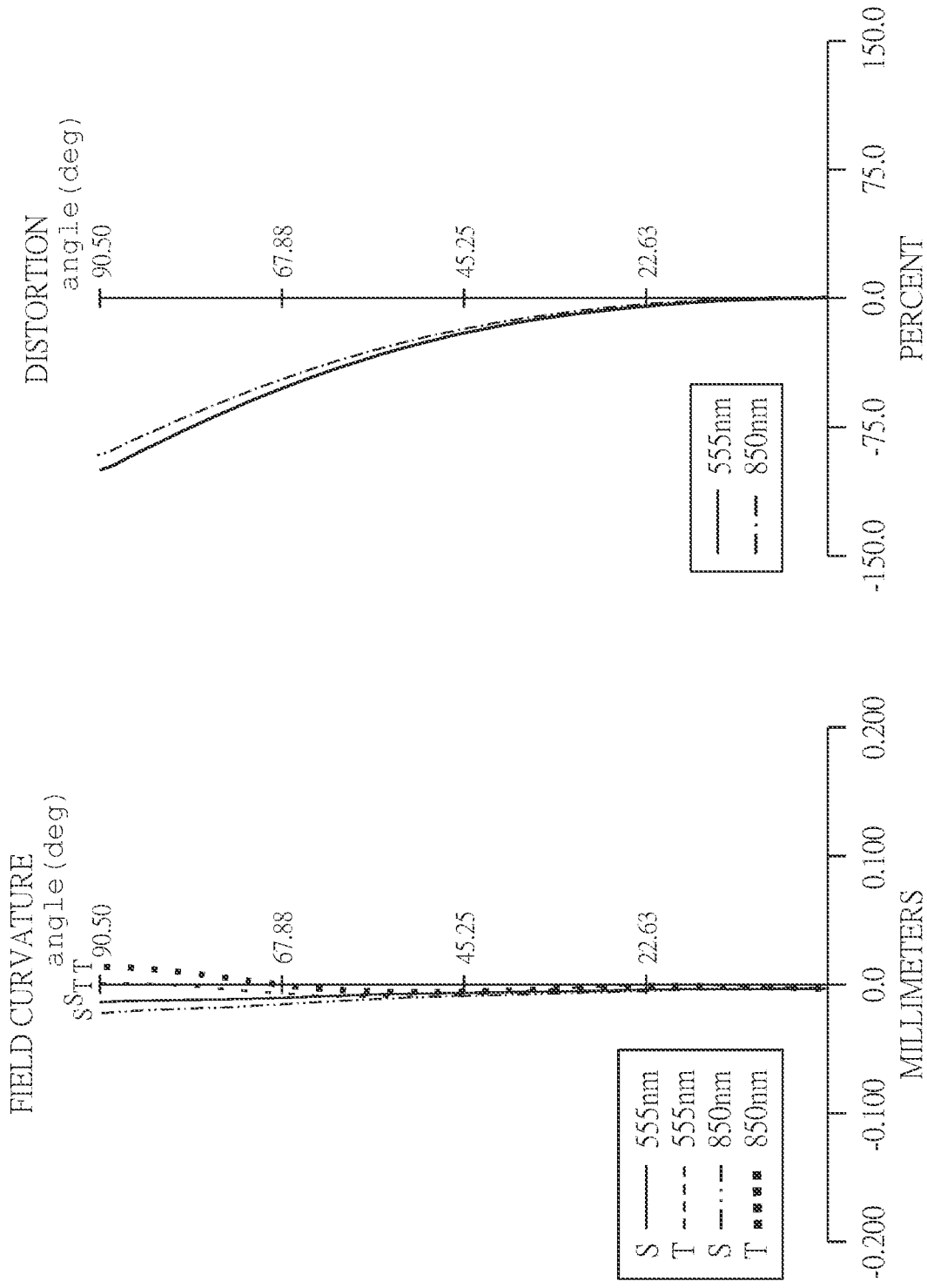
FIG. 3B shows the field curvature curve and the distortion curve of the third embodiment of the present invention, showing the state of the field curvature curve and the distortion curve in both visible and infrared light wavelengths.

Referring to FIGS. 3A and 3B, FIG. 3A shows an optical lens assembly in accordance with a third embodiment of the present invention, and FIG. 3B shows, in order from left to right, the field curvature curve and the distortion curve of the third embodiment of the present invention, showing the state of the field curvature curve and the distortion curve in both visible and infrared light wavelengths. An optical lens assembly in accordance with the third embodiment of the present invention comprises, in order from an object side to an image side along an optical axis 390: a first lens 310, a second lens 320, a third lens 330, a stop 300, a fourth lens 340, a fifth lens 350, a sixth lens 360, a seventh lens 370, a filter 381, and an image plane 383. The optical lens assembly is provided with an image sensor 385. Wherein the optical lens assembly has a total of seven lenses with refractive power, but not limited to this. The image sensor 385 is disposed on the image plane 383.

The first lens 310 with negative refractive power, comprising an object-side surface 311 and an image-side surface 312, the object-side surface 311 of the first lens 310 being convex near the optical axis 390 and the image-side surface 312 of the first lens 310 being concave near the optical axis 390, and the first lens 310 is made of glass material.

The second lens 320 with negative refractive power, comprising an object-side surface 321 and an image-side surface 322, the object-side surface 321 of the second lens 320 being convex near the optical axis 390 and the image-side surface 322 of the second lens 320 being concave near the optical axis 390, the object-side surface 321 and the image-side surface 322 of the second lens 320 are aspheric, and the second lens 320 is made of plastic material.

The third lens 330 with positive refractive power, comprising an object-side surface 331 and an image-side surface 332, the object-side surface 331 of the third lens 330 being concave near the optical axis 390 and the image-side surface 332 of the third lens 330 being convex near the optical axis 390, the object-side surface 331 and the image-side surface 332 of the third lens 330 are aspheric, and the third lens 330 is made of plastic material.

The fourth lens 340 with positive refractive power, comprising an object-side surface 341 and an image-side surface 342, the object-side surface 341 of the fourth lens 340 being convex near the optical axis 390 and the image-side surface 342 of the fourth lens 340 being convex near the optical axis 390, the object-side surface 341 and the image-side surface 342 of the fourth lens 340 are aspheric, and the fourth lens 340 is made of plastic material.

The fifth lens 350 with negative refractive power, comprising an object-side surface 351 and an image-side surface 352, the object-side surface 351 of the fifth lens 350 being concave near the optical axis 390 and the image-side surface 352 of the fifth lens 350 being concave near the optical axis 390, the object-side surface 351 and the image-side surface 352 of the fifth lens 350 are aspheric, and the fifth lens 350 is made of plastic material.

The sixth lens 360 with positive refractive power, comprising an object-side surface 361 and an image-side surface 362, the object-side surface 361 of the sixth lens 360 being convex near the optical axis 390 and the image-side surface 362 of the sixth lens 360 being convex near the optical axis 390, and the sixth lens 360 is made of glass material.

The seventh lens 370 with negative refractive power, comprising an object-side surface 371 and an image-side surface 372, the object-side surface 371 of the seventh lens 370 being convex near the optical axis 390 and the image-side surface 372 of the seventh lens 370 being concave near the optical axis 390, the object-side surface 371 and the image-side surface 372 of the seventh lens 370 are aspheric, and the seventh lens 370 is made of plastic material.

The filter 381 made of glass is located between the seventh lens 370 and the image plane 383 and has no influence on the focal length of the optical lens assembly. The present embodiment selects an IR-Cut Filter Removable (ICR), which is a set of automatically switchable filters. The switch of the filter determines whether the image sensor can receive the infrared light wavelength, and the timing of switching the filter depends on the visible light intensity detected by an image sensor of a photographing lens, but not limited to this. A filter that allows the visible light wavelength, the infrared light wavelength or both the visible and infrared light wavelengths to pass may be selected.

The detailed optical data of the third embodiment is shown in table 5, and the aspheric surface data is shown in table 6.

TABLE 5

Embodiment 3 f(focal length) = 1.30 mm, Fno = 2.3, FOV = 180.0 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | Lens 1 | 7.270 | | 1.079 | glass | 1.773 | 49.6 | −9.50 |
| 2 | | 3.423 | | 0.406 | | | | |
| 3 | Lens 2 | 2.736 | (ASP) | 0.485 | plastic | 1.544 | 56.0 | −2.30 |
| 4 | | 0.808 | (ASP) | 0.765 | | | | |
| 5 | Lens 3 | −148.327 | (ASP) | 0.930 | plastic | 1.661 | 20.4 | 6.63 |
| 6 | | −4.301 | (ASP) | 0.044 | | | | |
| 7 | stop | infinity | | −0.004 | | | | |
| 8 | Lens 4 | 2.034 | (ASP) | 0.591 | plastic | 1.544 | 56.0 | 1.35 |
| 9 | | −1.039 | (ASP) | 0.035 | | | | |
| 10 | Lens 5 | −51.353 | (ASP) | 0.373 | plastic | 1.661 | 20.4 | −1.93 |
| 11 | | 1.320 | (ASP) | 0.173 | | | | |

TABLE 5-continued

Embodiment 3 f(focal length) = 1.30 mm, Fno = 2.3, FOV = 180.0 deg.

| surface | | Curvature Radius | | Thickness/gap | Material | Index (nd) | Abbe # (vd) | Focal length |
|---|---|---|---|---|---|---|---|---|
| 12 | Lens 6 | 5.372 | | 1.105 | glass | 1.729 | 54.7 | 1.99 |
| 13 | | −1.820 | | 0.157 | | | | |
| 14 | Lens 7 | 5.964 | (ASP) | 0.594 | plastic | 1.661 | 20.4 | −3.49 |
| 15 | | 1.608 | (ASP) | 0.253 | | | | |
| 16 | filter | infinity | | 0.300 | glass | 1.517 | 64.2 | |
| 17 | | infinity | | 0.234 | | | | |
| 18 | Image plane | infinity | | — | | | | |

TABLE 6

Aspheric Coefficients

| surface | 3 | 4 | 5 | 6 | 8 |
|---|---|---|---|---|---|
| K: | −3.2249E+00 | −6.9428E−01 | −9.9914E+01 | 3.0208E+01 | −2.4681E+01 |
| A2: | 0.0000E+00 | 0.0000E+00 | 0.0000E+00 | 0.0000E+00 | 0.0000E+00 |
| A4: | −1.5218E−02 | 6.1062E−02 | −7.9839E−02 | −2.2977E−01 | 4.7306E−02 |
| A6: | −1.0955E−03 | 5.2272E−02 | 1.4911E−03 | 1.1354E+00 | 9.4893E−02 |
| A8: | −7.9765E−04 | −1.1393E−01 | 2.3922E−01 | −2.6922E+00 | −7.7213E−01 |
| A10: | 4.7920E−04 | 2.7182E−01 | 2.3922E−01 | 4.1444E+00 | 6.5691E−01 |
| A12: | −4.8326E−05 | −2.6718E−01 | −1.3288E−01 | −9.4560E−01 | −1.7899E−01 |
| A14: | −4.1473E−07 | 4.0448E−03 | 3.7896E−02 | 1.2248E+00 | 1.1656E−02 |
| A16: | 0.0000E+00 | 0.0000E+00 | 0.0000E+00 | 0.0000E+00 | 0.0000E+00 |
| surface | 9 | 10 | 11 | 14 | 15 |
| K: | −2.8885E+00 | −1.0028E+02 | −9.6943E+00 | −1.3205E+02 | −7.1311E+00 |
| A2: | 0.0000E+00 | 0.0000E+00 | 0.0000E+00 | 0.0000E+00 | 0.0000E+00 |
| A4: | −9.6327E−02 | −3.1486E−01 | 1.4157E−02 | −1.8750E−01 | −1.0602E−01 |
| A6: | −5.8811E−01 | 1.6480E−01 | 3.3176E−02 | −1.6093E−02 | 2.9569E−02 |
| A8: | 1.0656E+00 | −2.2585E−01 | −2.6790E−03 | 3.6966E−02 | −6.5776E−03 |
| A10: | −1.1027E+00 | 3.4615E−01 | −9.9388E−04 | −1.2425E−02 | 6.3227E−04 |
| A12: | −9.3950E−02 | −2.1980E−01 | −8.2421E−03 | 4.5387E−04 | −1.0212E−04 |
| A14: | 4.5787E−03 | 0.0000E+00 | 0.0000E+00 | 0.0000E+00 | 0.0000E+00 |
| A16: | 0.0000E+00 | 0.0000E+00 | 0.0000E+00 | 0.0000E+00 | 0.0000E+00 |

In the third embodiment, the equation of the aspheric surface profiles of the aforementioned lenses is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 1.30 | (CT1+CT2)/(R2 * R4) | 0.57 |
| EPD[mm] | 0.56 | f3/(f5 * f7) | 0.99 |
| Fno | 2.30 | f2/(f4 * f6) | −0.86 |
| FOV[deg.] | 180.00 | R13/(R14 * f7) | −1.06 |
| f1/f6 | −4.78 | f7 * CT7/R14 | −1.29 |
| f/f1 | −0.14 | (R10 * f5)/(R7 * R8 * f4) | 0.89 |
| f5/f7 | 0.55 | R2/R1 | 0.47 |
| f7/(f5 * f6) | 0.91 | TL * R4/IMH | 3.37 |
| f5/(R10 * CT5) | −3.91 | | |

Figure 4A:
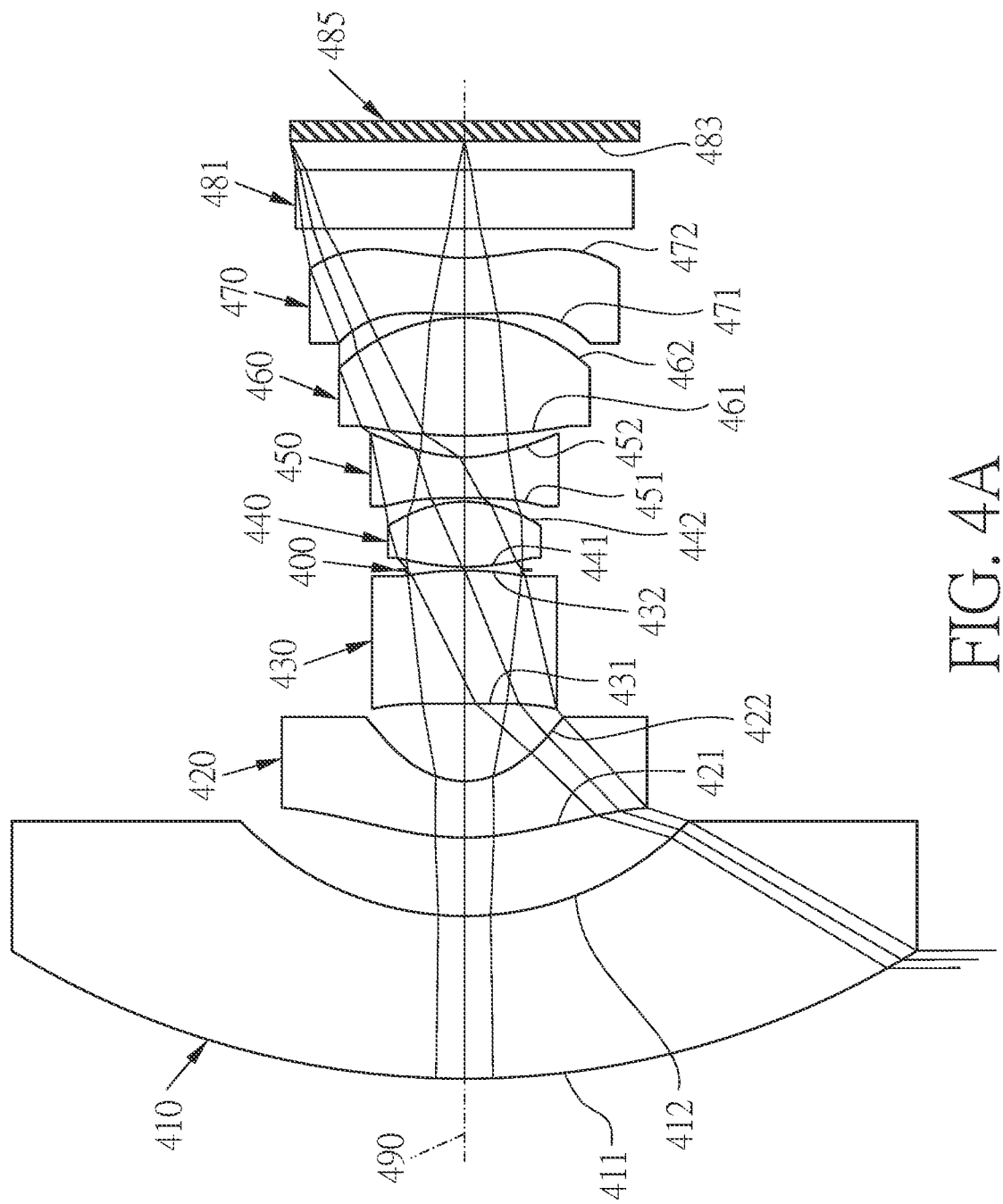
FIG. 4A shows an optical lens assembly in accordance with a fourth embodiment of the present invention.
Figure 4B:
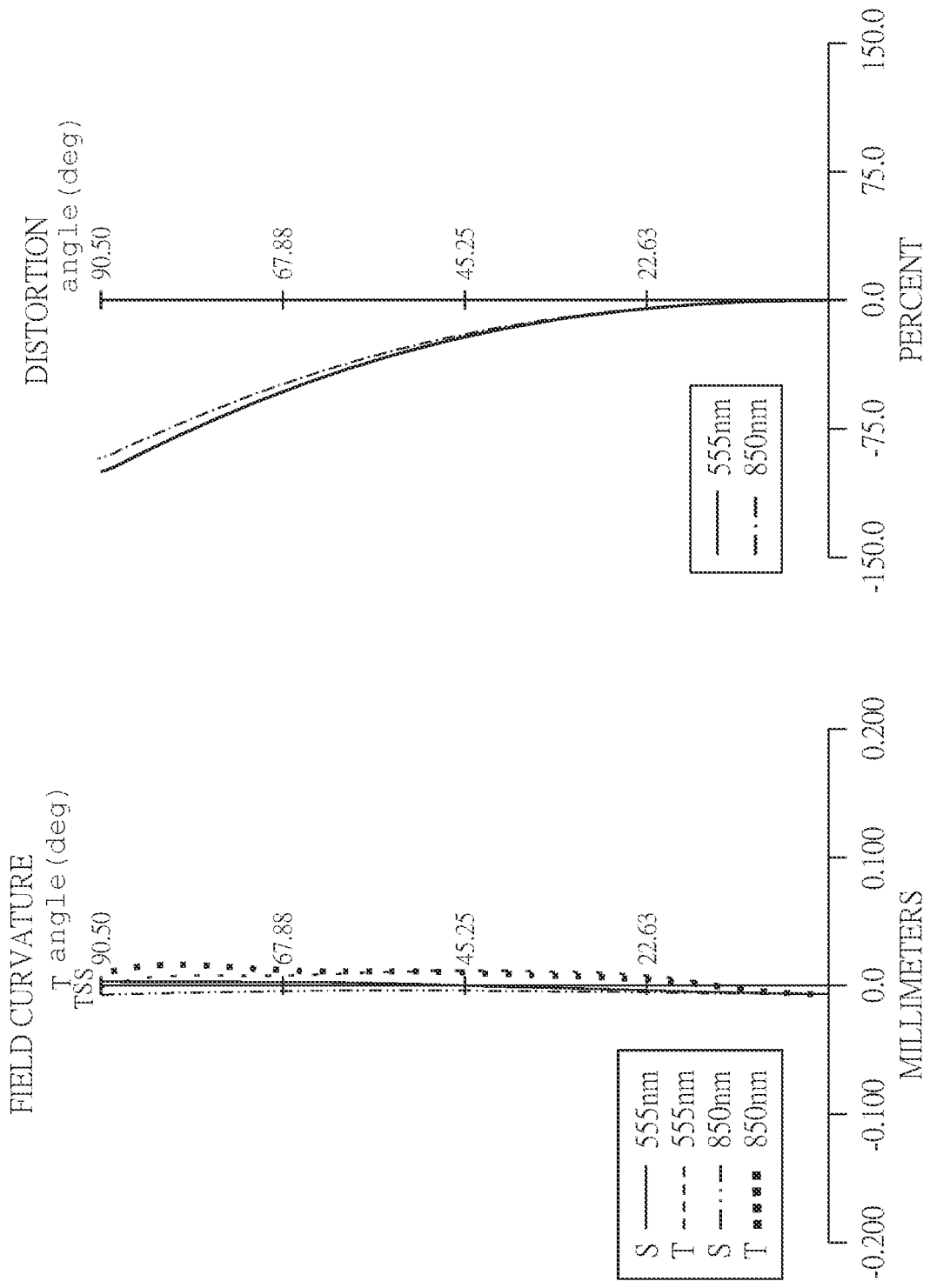
FIG. 4B shows the field curvature curve and the distortion curve of the fourth embodiment of the present invention, showing the state of the field curvature curve and the distortion curve in both visible and infrared light wavelengths.

Referring to FIGS. 4A and 4B, FIG. 4A shows an optical lens assembly in accordance with a fourth embodiment of the present invention, and FIG. 4B shows, in order from left to right, the field curvature curve and the distortion curve of the fourth embodiment of the present invention, showing the state of the field curvature curve and the distortion curve in both visible and infrared light wavelengths. An optical lens assembly in accordance with the fourth embodiment of the present invention comprises, in order from an object side to an image side along an optical axis 490: a first lens 410, a second lens 420, a third lens 430, a stop 400, a fourth lens 440, a fifth lens 450, a sixth lens 460, a seventh lens 470, a filter 481, and an image plane 483. The optical lens assembly is provided with an image sensor 485. Wherein the optical lens assembly has a total of seven lenses with refractive power, but not limited to this. The image sensor 485 is disposed on the image plane 483.

The first lens 410 with negative refractive power, comprising an object-side surface 411 and an image-side surface 412, the object-side surface 411 of the first lens 410 being convex near the optical axis 490 and the image-side surface 412 of the first lens 410 being concave near the optical axis 490, and the first lens 410 is made of glass material.

The second lens 420 with negative refractive power, comprising an object-side surface 421 and an image-side surface 422, the object-side surface 421 of the second lens 420 being convex near the optical axis 490 and the image-side surface 422 of the second lens 420 being concave near the optical axis 490, the object-side surface 421 and the image-side surface 422 of the second lens 420 are aspheric, and the second lens 420 is made of plastic material.

The third lens 430 with positive refractive power, comprising an object-side surface 431 and an image-side surface 432, the object-side surface 431 of the third lens 430 being convex near the optical axis 490 and the image-side surface 432 of the third lens 430 being convex near the optical axis 490, the object-side surface 431 and the image-side surface 432 of the third lens 430 are aspheric, and the third lens 430 is made of plastic material.

The fourth lens 440 with positive refractive power, comprising an object-side surface 441 and an image-side surface 442, the object-side surface 441 of the fourth lens 440 being convex near the optical axis 490 and the image-side surface 442 of the fourth lens 440 being convex near the optical axis 490, the object-side surface 441 and the image-side surface 442 of the fourth lens 440 are aspheric, and the fourth lens 440 is made of plastic material.

The fifth lens 450 with negative refractive power, comprising an object-side surface 451 and an image-side surface 452, the object-side surface 451 of the fifth lens 450 being concave near the optical axis 490 and the image-side surface 452 of the fifth lens 450 being concave near the optical axis 490, the object-side surface 451 and the image-side surface 452 of the fifth lens 450 are aspheric, and the fifth lens 450 is made of plastic material.

The sixth lens 460 with positive refractive power, comprising an object-side surface 461 and an image-side surface 462, the object-side surface 461 of the sixth lens 460 being convex near the optical axis 490 and the image-side surface 462 of the sixth lens 460 being convex near the optical axis 490, and the sixth lens 460 is made of glass material.

The seventh lens 470 with negative refractive power, comprising an object-side surface 471 and an image-side surface 472, the object-side surface 471 of the seventh lens 470 being convex near the optical axis 490 and the image-side surface 472 of the seventh lens 470 being concave near the optical axis 490, the object-side surface 471 and the image-side surface 472 of the seventh lens 470 are aspheric, and the seventh lens 470 is made of plastic material.

The filter 481 made of glass is located between the seventh lens 470 and the image plane 483 and has no influence on the focal length of the optical lens assembly. The present embodiment selects an IR-Cut Filter Removable (ICR), which is a set of automatically switchable filters. The switch of the filter determines whether the image sensor can receive the infrared light wavelength, and the timing of switching the filter depends on the visible light intensity detected by an image sensor of a photographing lens, but not limited to this. A filter that allows the visible light wavelength, the infrared light wavelength or both the visible and infrared light wavelengths to pass may be selected.

The detailed optical data of the fourth embodiment is shown in table 7, and the aspheric surface data is shown in table 8.

TABLE 7

Embodiment 4 f(focal length) = 1.29 mm, Fno = 2.2, FOV = 180.0 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | Lens 1 | 8.893 | | 1.681 | glass | 1.773 | 49.6 | −7.45 |
| 2 | | 3.213 | | 0.813 | | | | |
| 3 | Lens 2 | 2.866 | (ASP) | 0.579 | plastic | 1.544 | 56.0 | −2.55 |
| 4 | | 0.870 | (ASP) | 0.802 | | | | |
| 5 | Lens 3 | 264.203 | (ASP) | 1.377 | plastic | 1.661 | 20.4 | 6.64 |
| 6 | | −4.491 | (ASP) | 0.006 | | | | |
| 7 | stop | infinity | | 0.029 | | | | |
| 8 | Lens 4 | 1.996 | (ASP) | 0.680 | plastic | 1.544 | 56.0 | 1.48 |
| 9 | | −1.189 | (ASP) | 0.035 | | | | |
| 10 | Lens 5 | −38.386 | (ASP) | 0.419 | plastic | 1.661 | 20.4 | −1.83 |
| 11 | | 1.267 | (ASP) | 0.225 | | | | |
| 12 | Lens 6 | 5.878 | | 1.221 | glass | 1.729 | 54.7 | 2.07 |
| 13 | | −1.861 | | 0.037 | | | | |
| 14 | Lens 7 | 6.173 | (ASP) | 0.580 | plastic | 1.661 | 20.4 | −5.16 |
| 15 | | 2.127 | (ASP) | 0.300 | | | | |
| 16 | filter | infinity | | 0.610 | glass | 1.517 | 64.2 | |
| 17 | | infinity | | 0.297 | | | | |
| 18 | Image plane | infinity | | — | | | | |

TABLE 8

Aspheric Coefficients

| surface | 3 | 4 | 5 | 6 | 8 |
|---|---|---|---|---|---|
| K: | −2.8038E+00 | −7.5871E−01 | 9.1860E+01 | 2.8174E+01 | −2.5502E+01 |
| A2: | 0.0000E+00 | 0.0000E+00 | 0.0000E+00 | 0.0000E+00 | 0.0000E+00 |
| A4: | −1.7577E−02 | 3.8857E−02 | −4.9816E−02 | −2.4616E−01 | 7.6897E−02 |
| A6: | −1.0386E−03 | 3.5378E−02 | 4.4381E−02 | 1.0993E+00 | 1.3062E−01 |
| A8: | −6.6971E−04 | −1.1960E−01 | 2.1274E−01 | −2.6368E+00 | −7.3246E−01 |
| A10 | 4.6162E−04 | 2.4478E−01 | 2.1274E−01 | 3.9871E+00 | 8.7231E−01 |
| A12 | −5.8790E−05 | −2.6897E−01 | −1.4152E−01 | −2.4698E+00 | 3.5436E−01 |

TABLE 8-continued

| Aspheric Coefficients | | | | | |
|---|---|---|---|---|---|
| A14 | 1.0608E−06 | 8.1913E−02 | 4.6704E−02 | 7.4200E−01 | −6.0886E−01 |
| A16 | 3.4519E−08 | 6.6656E−04 | 0.0000E+00 | 0.0000E+00 | 0.0000E+00 |
| surface | 9 | 10 | 11 | 14 | 15 |
| K: | −3.5029E+00 | −1.0085E+02 | −8.2660E+00 | −1.0010E+02 | −6.6184E+00 |
| A2: | 0.0000E+00 | 0.0000E+00 | 0.0000E+00 | 0.0000E+00 | 0.0000E+00 |
| A4: | −2.4318E−02 | −2.6316E−01 | 8.2692E−03 | −1.3733E−01 | −1.2764E−01 |
| A6: | −4.8149E−01 | 1.8153E−01 | 2.9374E−02 | −2.2570E−02 | 3.4647E−02 |
| A8: | 1.0576E+00 | −2.1206E−01 | −1.5177E−03 | 2.8467E−02 | −8.1269E−03 |
| A10 | −1.1071E+00 | 3.2129E−01 | −2.1254E−03 | −1.1488E−02 | 7.5542E−04 |
| A12 | 9.3421E−02 | −2.1955E−01 | −1.1028E−02 | 1.8463E−03 | 1.4488E−04 |
| A14 | 6.9721E−01 | 9.8994E−02 | 6.2378E−03 | −1.2657E−04 | −4.4414E−05 |
| A16 | 0.0000E+00 | 0.0000E+00 | 0.0000E+00 | 0.0000E+00 | 0.0000E+00 |

In the fourth embodiment, the equation of the aspheric surface profiles of the aforementioned lenses is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 1.29 | (CT1+CT2)/(R2*R4) | 0.81 |
| EPD[mm] | 0.59 | f3/(f5*f7) | 0.70 |
| Fno | 2.20 | f2/(f4*f6) | −0.83 |
| FOV[deg.] | 180.00 | R13/(R14*f7) | −0.56 |
| f1/f6 | −3.60 | f7*CT7/R14 | −1.41 |
| f/f1 | −0.17 | (R10*f5)/(R7*R8*f4) | 0.66 |
| f5/f7 | 0.35 | R2/R1 | 0.36 |
| f7/(f5*f6) | 1.36 | TL*R4/IMH | 4.68 |
| £5/(R10*CT5) | −3.46 | | |

Figure 5A:
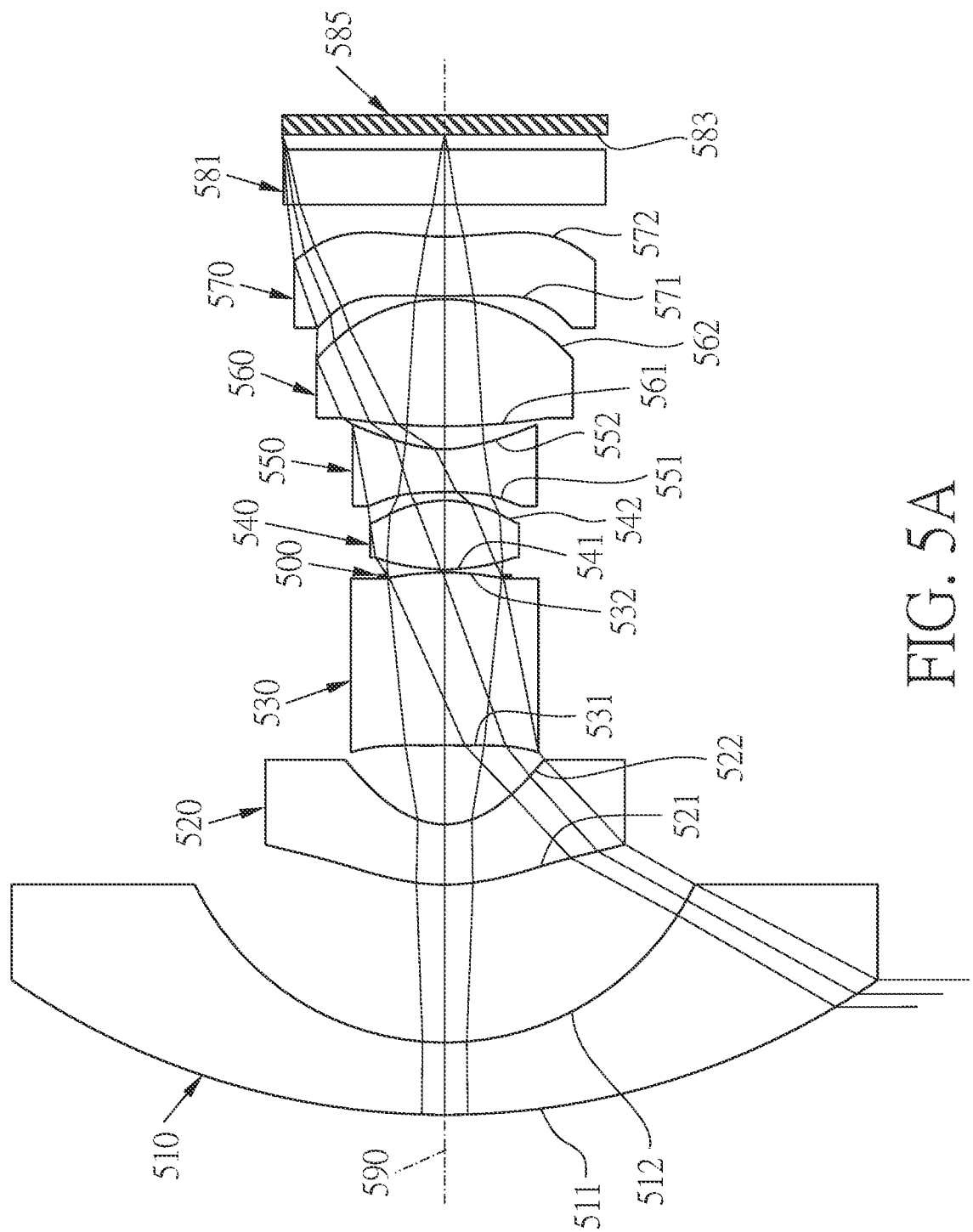
FIG. 5A shows an optical lens assembly in accordance with a fifth embodiment of the present invention.
Figure 5B:
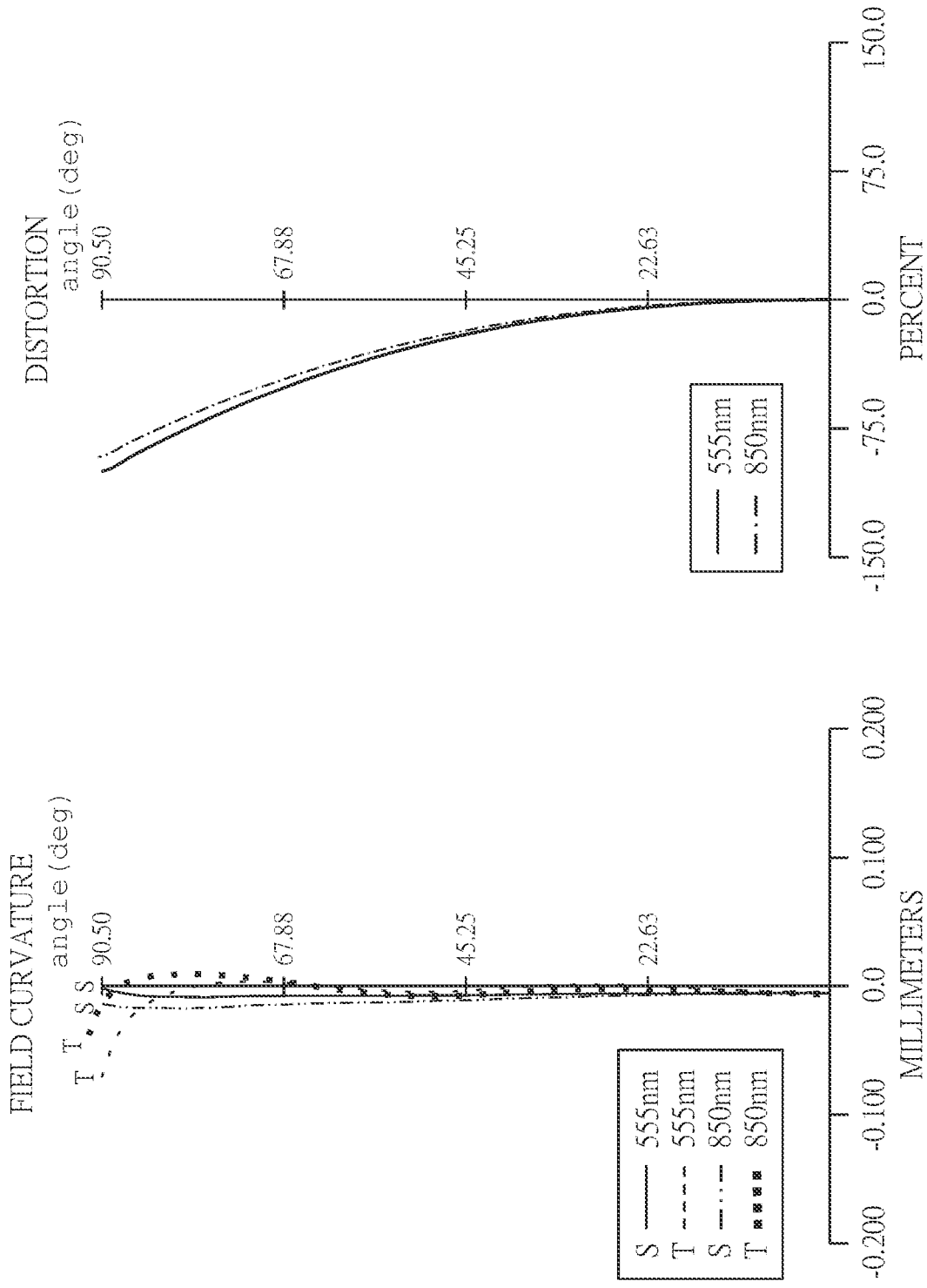
FIG. 5B shows the field curvature curve and the distortion curve of the fifth embodiment of the present invention, showing the state of the field curvature curve and the distortion curve in both visible and infrared light wavelengths.

Referring to FIGS. 5A and 5B, FIG. 5A shows an optical lens assembly in accordance with a fifth embodiment of the present invention, and FIG. 5B shows, in order from left to right, the field curvature curve and the distortion curve of the fifth embodiment of the present invention, showing the state of the field curvature curve and the distortion curve in both visible and infrared light wavelengths. An optical lens assembly in accordance with the fifth embodiment of the present invention comprises, in order from an object side to an image side along an optical axis 590: a first lens 510, a second lens 520, a third lens 530, a stop 500, a fourth lens 540, a fifth lens 550, a sixth lens 560, a seventh lens 570, a filter 581, and an image plane 583. The optical lens assembly is provided with an image sensor 585. Wherein the optical lens assembly has a total of seven lenses with refractive power, but not limited to this. The image sensor 585 is disposed on the image plane 583.

The first lens 510 with negative refractive power, comprising an object-side surface 511 and an image-side surface 512, the object-side surface 511 of the first lens 510 being convex near the optical axis 590 and the image-side surface 512 of the first lens 510 being concave near the optical axis 590, and the first lens 510 is made of glass material.

The second lens 520 with negative refractive power, comprising an object-side surface 521 and an image-side surface 522, the object-side surface 521 of the second lens 520 being convex near the optical axis 590 and the image-side surface 522 of the second lens 520 being concave near the optical axis 590, the object-side surface 521 and the image-side surface 522 of the second lens 520 are aspheric, and the second lens 520 is made of plastic material.

The third lens 530 with positive refractive power, comprising an object-side surface 531 and an image-side surface 532, the object-side surface 531 of the third lens 530 being convex near the optical axis 590 and the image-side surface 532 of the third lens 530 being convex near the optical axis 590, the object-side surface 531 and the image-side surface 532 of the third lens 530 are aspheric, and the third lens 530 is made of plastic material.

The fourth lens 540 with positive refractive power, comprising an object-side surface 541 and an image-side surface 542, the object-side surface 541 of the fourth lens 540 being convex near the optical axis 590 and the image-side surface 542 of the fourth lens 540 being convex near the optical axis 590, the object-side surface 541 and the image-side surface 542 of the fourth lens 540 are aspheric, and the fourth lens 540 is made of plastic material.

The fifth lens 550 with negative refractive power, comprising an object-side surface 551 and an image-side surface 552, the object-side surface 551 of the fifth lens 550 being concave near the optical axis 590 and the image-side surface 552 of the fifth lens 550 being concave near the optical axis 590, the object-side surface 551 and the image-side surface 552 of the fifth lens 550 are aspheric, and the fifth lens 550 is made of plastic material.

The sixth lens 560 with positive refractive power, comprising an object-side surface 561 and an image-side surface 562, the object-side surface 561 of the sixth lens 560 being convex near the optical axis 590 and the image-side surface 562 of the sixth lens 560 being convex near the optical axis 590, and the sixth lens 560 is made of glass material.

The seventh lens 570 with negative refractive power, comprising an object-side surface 571 and an image-side surface 572, the object-side surface 571 of the seventh lens 570 being convex near the optical axis 590 and the image-side surface 572 of the seventh lens 570 being concave near the optical axis 590, the object-side surface 571 and the image-side surface 572 of the seventh lens 570 are aspheric, and the seventh lens 570 is made of plastic material.

The filter 581 made of glass is located between the seventh lens 570 and the image plane 583 and has no influence on the focal length of the optical lens assembly. The present embodiment selects an IR-Cut Filter Removable (ICR), which is a set of automatically switchable filters. The switch of the filter determines whether the image sensor can receive the infrared light wavelength, and the timing of switching the filter depends on the visible light intensity detected by an image sensor of a photographing lens, but not limited to this. A filter that allows the visible light wavelength, the infrared light wavelength or both the visible and infrared light wavelengths to pass may be selected.

The detailed optical data of the fifth embodiment is shown in table 9, and the aspheric surface data is shown in table 10.

TABLE 9

Embodiment 5 f(focal length) = 1.12 mm, Fno = 2.2, FOV= 180.0 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | Lens 1 | 8.430 | | 0.800 | glass | 1.773 | 49.6 | −6.61 |
| 2 | | 3.057 | | 1.751 | | | | |
| 3 | Lens 2 | 2.374 | (ASP) | 0.670 | plastic | 1.544 | 56.0 | −2.96 |
| 4 | | 0.866 | (ASP) | 0.876 | | | | |
| 5 | Lens 3 | −211.823 | (ASP) | 1.912 | plastic | 1.661 | 20.4 | 5.66 |
| 6 | | −3.721 | (ASP) | −0.032 | | | | |
| 7 | stop | infinity | | 0.067 | | | | |
| 8 | Lens 4 | 2.030 | (ASP) | 0.762 | plastic | 1.544 | 56.0 | 1.50 |
| 9 | | −1.198 | (ASP) | 0.095 | | | | |
| 10 | Lens 5 | −5.779 | (ASP) | 0.475 | plastic | 1.661 | 20.4 | −1.45 |
| 11 | | 1.198 | (ASP) | 0.257 | | | | |
| 12 | Lens 6 | 7.207 | | 1.406 | glass | 1.729 | 54.7 | 2.15 |
| 13 | | −1.842 | | 0.035 | | | | |
| 14 | Lens 7 | 8.867 | (ASP) | 0.660 | plastic | 1.661 | 20.4 | −10.53 |
| 15 | | 3.802 | (ASP) | 0.353 | | | | |
| 16 | filter | infinity | | 0.610 | glass | 1.517 | 64.2 | |
| 17 | | infinity | | 0.157 | | | | |
| 18 | Image plane | infinity | | — | | | | |

TABLE 10

Aspheric Coefficients

| surface | 3 | 4 | 5 | 6 | 8 |
|---|---|---|---|---|---|
| K: | −2.0467E+00 | −7.6121E−01 | 6.9960E+01 | 2.5806E+01 | −2.6822E+01 |
| A2: | 0.0000E+00 | 0.0000E+00 | 0.0000E+00 | 0.0000E+00 | 0.0000E+00 |
| A4: | −9.5466E−03 | 2.4508E−02 | −2.6649E−02 | −1.8238E−01 | 1.1443E−01 |
| A6: | −8.8782E−03 | −4.7982E−02 | −2.1318E−02 | 1.2033E+00 | 2.3576E−01 |
| A8: | −1.4563E−03 | 8.2995E−02 | 2.3022E−01 | −3.7301E+00 | −1.9455E+00 |
| A10 | 3.0175E−03 | −3.5488E−01 | 2.3022E−01 | 8.3491E+00 | 7.1431E+00 |
| A12 | −1.0316E−03 | 5.4187E−01 | −3.0935E−01 | −6.1988E+00 | −1.5949E+01 |
| A14 | 1.5604E−04 | −3.7978E−01 | 2.0836E−01 | −9.2964E+00 | 2.0272E+01 |
| A16 | −9.1992E−06 | 1.0067E−01 | −5.2503E−02 | 1.8374E+01 | −1.0372E+01 |

| surface | 9 | 10 | 11 | 14 | 15 |
|---|---|---|---|---|---|
| K: | −3.4951E+00 | 3.2378E+01 | −7.0964E+00 | 2.0532E+01 | 6.8611E−01 |
| A2: | 0.0000E+00 | 0.0000E+00 | 0.0000E+00 | 0.0000E+00 | 0.0000E+00 |
| A4: | −2.7155E−02 | −2.4736E−01 | 2.4751E−02 | −1.0607E−01 | −1.0037E−01 |
| A6: | −6.9514E−01 | −2.3504E−01 | −2.3221E−01 | −3.4191E−03 | 5.9019E−03 |
| A8: | 3.0017E+00 | 1.5954E+00 | 8.3630E−01 | 5.3133E−03 | −8.3297E−03 |
| A10 | −8.5707E+00 | −3.9298E+00 | −1.5411E+00 | −2.9439E−02 | 5.8589E−03 |
| A12 | 1.5799E+01 | 5.6541E+00 | 1.6577E+00 | 3.1199E−02 | −1.3295E−03 |
| A14 | −1.6625E+01 | −4.1596E+00 | −9.6567E−01 | −1.4984E−02 | −3.5045E−05 |
| A16 | 7.9624E+00 | 1.3877E+00 | 2.3426E−01 | 2.8725E−03 | 4.2833E−05 |

In the fifth embodiment, the equation of the aspheric surface profiles of the aforementioned lenses is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 1.12 | (CT1 + CT2)/(R2 * R4) | 0.56 |
| EPD[mm] | 0.51 | f3/(f5 * f7) | 0.37 |

-continued

| Embodiment 5 | | | |
|---|---|---|---|
| Fno | 2.20 | f2/(f4 *f6) | −0.92 |
| FOV[deg.] | 180.00 | R13/(R14 * f7) | −0.22 |
| f1/f6 | −3.08 | f7 * CT7/R14 | −1.83 |
| f/f1 | −0.17 | (R10 * f5)/(R7 * R8 * f4) | 0.47 |
| f5/f7 | 0.14 | R2/R1 | 0.36 |

-continued

Embodiment 5

| | | | | |
|---|---|---|---|---|
| f7/(f5*f6) | 3.39 | TL * R4/IMH | 5.23 | |
| f5/(R10*CT5) | −2.54 | | | |

Figure 6A:
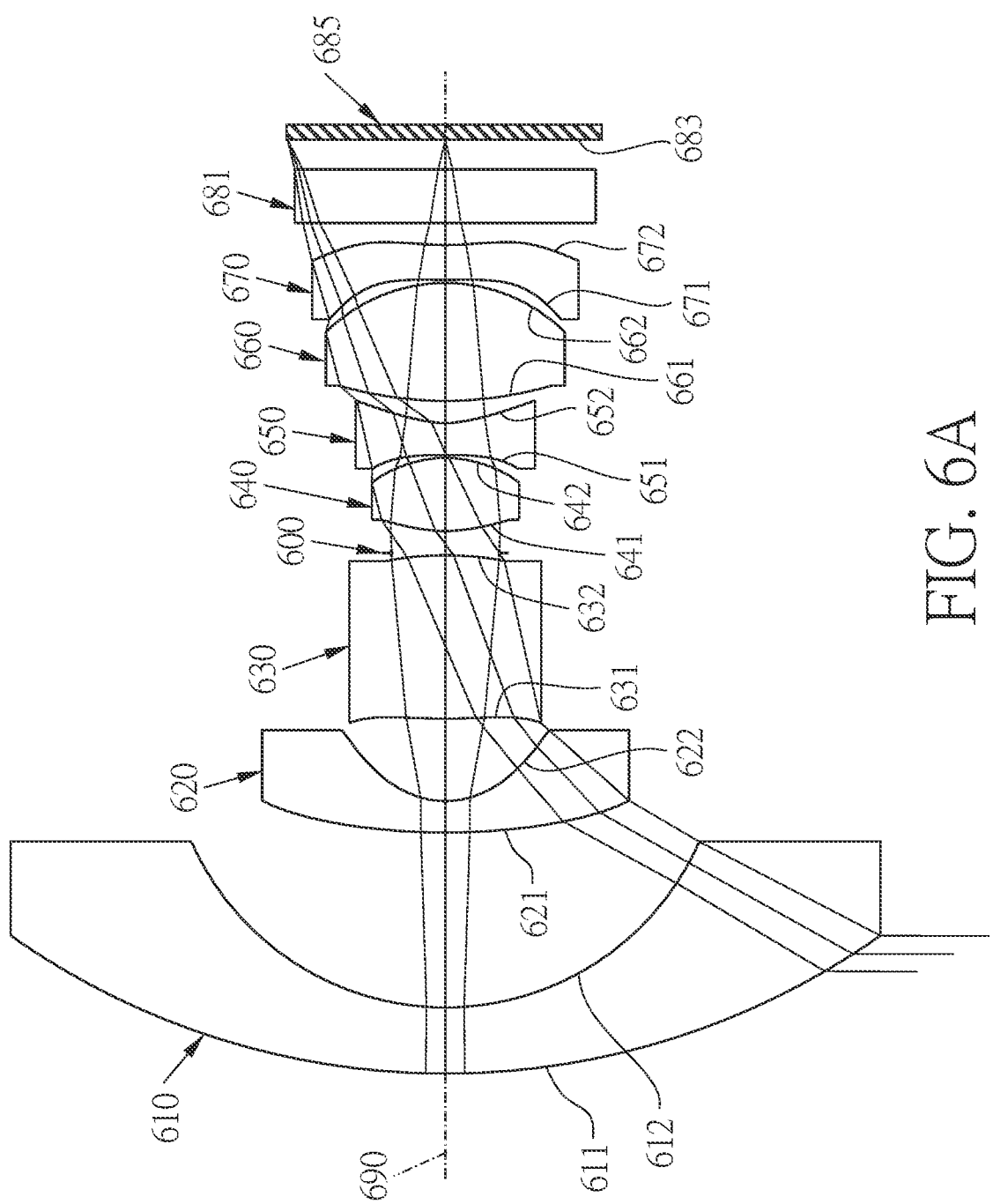
FIG. 6A shows an optical lens assembly in accordance with a sixth embodiment of the present invention.
Figure 6B:
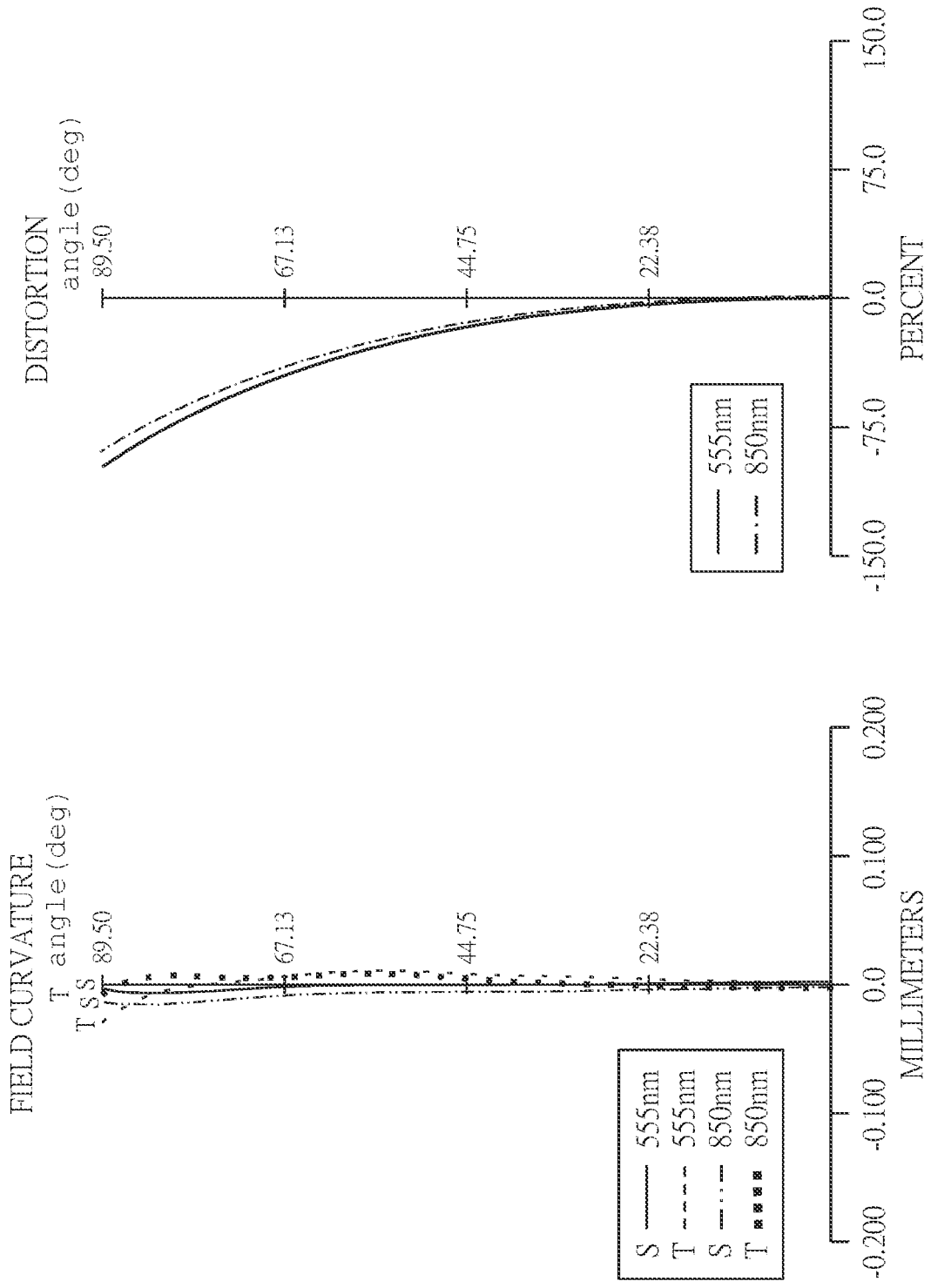
FIG. 6B shows the field curvature curve and the distortion curve of the sixth embodiment of the present invention, showing the state of the field curvature curve and the distortion curve in both visible and infrared light wavelengths.

Referring to FIGS. 6A and 6B, FIG. 6A shows an optical lens assembly in accordance with a sixth embodiment of the present invention, and FIG. 6B shows, in order from left to right, the field curvature curve and the distortion curve of the sixth embodiment of the present invention, showing the state of the field curvature curve and the distortion curve in both visible and infrared light wavelengths. An optical lens assembly in accordance with the sixth embodiment of the present invention comprises, in order from an object side to an image side along an optical axis 690: a first lens 610, a second lens 620, a third lens 630, a stop 600, a fourth lens 640, a fifth lens 650, a sixth lens 660, a seventh lens 670, a filter 681, and an image plane 683. The optical lens assembly is provided with an image sensor 685. Wherein the optical lens assembly has a total of seven lenses with refractive power, but not limited to this. The image sensor 685 is disposed on the image plane 683.

The first lens 610 with negative refractive power, comprising an object-side surface 611 and an image-side surface 612, the object-side surface 611 of the first lens 610 being convex near the optical axis 690 and the image-side surface 612 of the first lens 610 being concave near the optical axis 690, and the first lens 610 is made of glass material.

The second lens 620 with negative refractive power, comprising an object-side surface 621 and an image-side surface 622, the object-side surface 621 of the second lens 620 being convex near the optical axis 690 and the image-side surface 622 of the second lens 620 being concave near the optical axis 690, the object-side surface 621 and the image-side surface 622 of the second lens 620 are aspheric, and the second lens 620 is made of plastic material.

The third lens 630 with positive refractive power, comprising an object-side surface 631 and an image-side surface 632, the object-side surface 631 of the third lens 630 being convex near the optical axis 690 and the image-side surface 632 of the third lens 630 being convex near the optical axis 690, the object-side surface 631 and the image-side surface 632 of the third lens 630 are aspheric, and the third lens 630 is made of plastic material.

The fourth lens 640 with positive refractive power, comprising an object-side surface 641 and an image-side surface 642, the object-side surface 641 of the fourth lens 640 being convex near the optical axis 690 and the image-side surface 642 of the fourth lens 640 being convex near the optical axis 690, the object-side surface 641 and the image-side surface 642 of the fourth lens 640 are aspheric, and the fourth lens 640 is made of plastic material.

The fifth lens 650 with negative refractive power, comprising an object-side surface 651 and an image-side surface 652, the object-side surface 651 of the fifth lens 650 being concave near the optical axis 690 and the image-side surface 652 of the fifth lens 650 being concave near the optical axis 690, the object-side surface 651 and the image-side surface 652 of the fifth lens 650 are aspheric, and the fifth lens 650 is made of plastic material.

The sixth lens 660 with positive refractive power, comprising an object-side 1o surface 661 and an image-side surface 662, the object-side surface 661 of the sixth lens 660 being convex near the optical axis 690 and the image-side surface 662 of the sixth lens 660 being convex near the optical axis 690, and the sixth lens 660 is made of glass material.

The seventh lens 670 with negative refractive power, comprising an object-side surface 671 and an image-side surface 672, the object-side surface 671 of the seventh lens 670 being convex near the optical axis 690 and the image-side surface 672 of the seventh lens 670 being concave near the optical axis 690, the object-side surface 671 and the image-side surface 672 of the seventh lens 670 are aspheric, and the seventh lens 670 is made of plastic material.

The filter 681 made of glass is located between the seventh lens 670 and the image plane 683 and has no influence on the focal length of the optical lens assembly. The present embodiment selects an IR-Cut Filter Removable (ICR), which is a set of automatically switchable filters. The switch of the filter determines whether the image sensor can receive the infrared light wavelength, and the timing of switching the filter depends on the visible light intensity detected by an image sensor of a photographing lens, but not limited to this. A filter that allows the visible light wavelength, the infrared light wavelength or both the visible and infrared light wavelengths to pass may be selected.

The detailed optical data of the sixth embodiment is shown in table 11, and the aspheric surface data is shown in table 12.

TABLE 11

Embodiment 6 f(focal length) = 0.94 mm, Fno = 2.1, FOV = 180.0 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | Lens 1 | 8.576 | | 0.750 | glass | 1.773 | 49.6 | −6.84 |
| 2 | | 3.153 | | 1.996 | | | | |
| 3 | Lens 2 | 7.683 | (ASP) | 0.359 | plastic | 1.544 | 56.0 | −2.10 |
| 4 | | 0.980 | (ASP) | 0.937 | | | | |
| 5 | Lens 3 | 8.259 | (ASP) | 1.863 | plastic | 1.661 | 20.4 | 4.68 |
| 6 | | −4.574 | (ASP) | 0.025 | | | | |
| 7 | stop | infinity | | 0.251 | | | | |
| 8 | Lens 4 | 1.844 | (ASP) | 0.834 | plastic | 1.544 | 56.0 | 1.45 |
| 9 | | −1.173 | (ASP) | 0.033 | | | | |
| 10 | Lens 5 | −10.325 | (ASP) | 0.364 | plastic | 1.661 | 20.4 | −1.48 |
| 11 | | 1.105 | (ASP) | 0.249 | | | | |
| 12 | Lens 6 | 4.189 | | 1.347 | glass | 1.729 | 54.7 | 1.99 |
| 13 | | −1.926 | | 0.033 | | | | |

TABLE 11-continued

Embodiment 6 f(focal length) = 0.94 mm, Fno = 2.1, FOV = 180.0 deg.

| surface | | Curvature Radius | | Thickness/gap | Material | Index (nd) | Abbe # (vd) | Focal length |
|---|---|---|---|---|---|---|---|---|
| 14 | Lens 7 | 15.518 | (ASP) | 0.399 | plastic | 1.661 | 20.4 | −6.60 |
| 15 | | 3.396 | (ASP) | 0.250 | | | | |
| 16 | filter | infinity | | 0.610 | glass | 1.517 | 64.2 | |
| 17 | | infinity | | 0.333 | | | | |
| 18 | Image plane | infinity | | — | | | | |

TABLE 12

Aspheric Coefficients

| surface | 3 | 4 | 5 | 6 | 8 |
|---|---|---|---|---|---|
| K: | 3.2819E+00 | −6.4544E−01 | 3.8113E+01 | 2.6083E+01 | −1.1807E+01 |
| A2: | 0.0000E+00 | 0.0000E+00 | 0.0000E+00 | 0.0000E+00 | 0.0000E+00 |
| A4: | 7.7668E−03 | 5.3903E−03 | −6.7759E−02 | −8.2240E−02 | 1.5333E−01 |
| A6: | −1.0167E−02 | 2.1833E−02 | 2.7501E−05 | 1.5444E−01 | −3.6216E−01 |
| A8: | 6.3026E−03 | −E3537E−01 | 9.1918E−02 | −3.2833E−01 | 8.0127E−01 |
| A10: | −2.1535E−03 | 3.0234E−01 | 9.1918E−02 | 1.0250E+00 | −1.4395E+00 |
| A12: | 4.5361E−04 | −3.6488E−01 | −7.6011E−02 | −1.5655E+00 | 1.4667E+00 |
| A14: | −5.5520E−05 | 2.3409E−01 | 2.3823E−02 | 1.0292E+00 | −7.6487E−01 |
| A16: | 3.1472E−06 | −6.2780E−02 | 2.1942E−05 | 2.5909E−02 | −2.1311E−03 |

| surface | 9 | 10 | 11 | 14 | 15 |
|---|---|---|---|---|---|
| K: | −5.2922E+00 | 9.8429E+01 | −7.8661E+00 | 2.4091E+00 | −3.3776E+01 |
| A2: | 0.0000E+00 | 0.0000E+00 | 0.0000E+00 | 0.0000E+00 | 0.0000E+00 |
| A4: | −2.2344E−02 | −3.3224E−01 | −4.9544E−02 | −2.0663E−01 | −8.3657E−02 |
| A6: | −4.6508E−01 | 2.4199E−01 | 3.0850E−02 | 3.3310E−02 | −5.7718E−02 |
| A8: | 1.1641E+00 | −3.6833E−01 | E3271E−01 | −6.4648E−02 | 6.7423E−02 |
| A10: | −E7775E+00 | 9.6067E−01 | −2.9250E−01 | 7.2993E−02 | −3.2038E−02 |
| A12: | E3320E+00 | −E8408E+00 | 2.8031E−01 | −2.6886E−01 | E1235E−02 |
| A14: | −4.2831E−01 | E5408E+00 | −E3720E−01 | 1.3118E−04 | −2.9522E−03 |
| A16: | 2.4436E−04 | −3.7384E−01 | 2.9390E−02 | E3147E−03 | 3.8274E−04 |

In the sixth embodiment, the equation of the aspheric surface profiles of the aforementioned lenses is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 0.94 | (CT1+CT2)/(R2 * R4) | 0.36 |
| EPD[mm] | 0.44 | f3/(f5 * f7) | 0.48 |
| Fno | 2.10 | f2/(f4 * f6) | −0.72 |
| FOV[deg.] | 180.00 | R13/(R14 * f7) | −0.69 |
| f1/f6 | −3.44 | f7 * CT7/R14 | −0.78 |
| f/f1 | −0.14 | (R10 * f5)/(R7 * R8 * f4) | 0.52 |
| f5/f7 | 0.22 | R2/R1 | 0.37 |
| f7/(f5 * f6) | 2.25 | TL * R4/IMH | 5.80 |
| f5/(R10 * CT5) | −3.68 | | |

Figure 7:
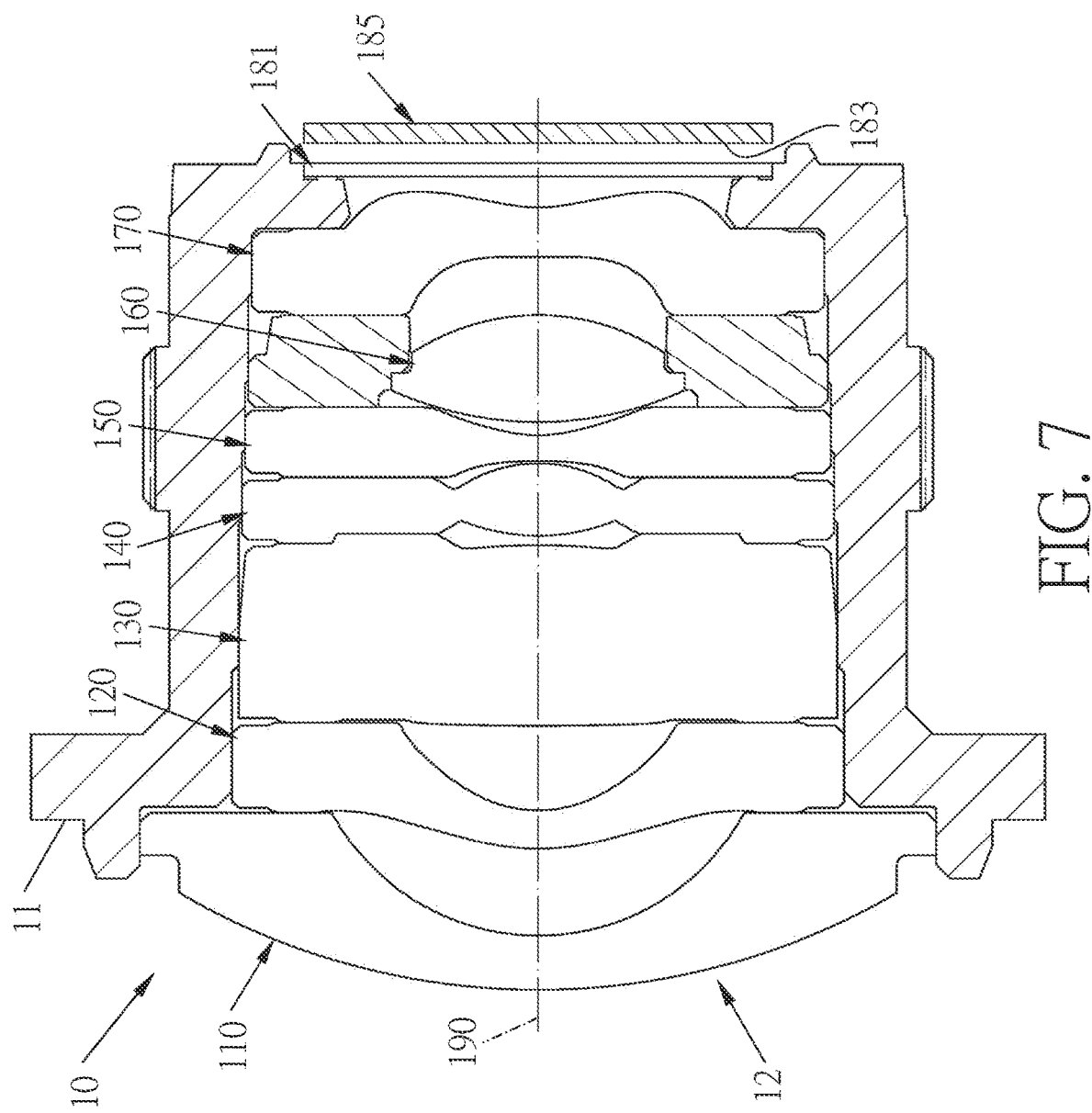
FIG. 7 shows a photographing module in accordance with a seventh embodiment of the present invention.

Referring to FIG. 7, which shows a photographing module in accordance with a seventh embodiment of the present invention, the photographing module 10 is applied to a security camera, but not limited to this. The photographing module 10 includes a lens barrel 11, an optical lens assembly 12 and an image sensor 185. The optical lens assembly 12 is the optical lens assembly of the above first embodiment, but not limited to this, and can also be the optical lens assemblies of the other embodiments. In addition, the lenses of the optical lens assembly in FIG. 7 show the unlit peripheral parts, which is slightly different from that of the first embodiment. The optical lens assembly 12 is disposed in the lens barrel 11. The image sensor 185 is disposed on an image plane 183 of the optical lens assembly 12 and is an electronic sensor (such as, CMOS, CCD) with good brightness and low noise to really present the imaging quality of the optical lens assembly.

In the present optical lens assembly, the lenses can be made of plastic or glass. If the lenses are made of plastic, the cost will be effectively reduced. If the lenses are made of glass, there is more freedom in distributing the refractive power of the optical lens assembly. Plastic lenses can have aspheric surfaces, which allow more design parameter freedom (than spherical surfaces), so as to reduce the aberration and the number of the lenses, as well as the total length of the optical lens assembly.

In the present optical lens assembly, the filter is made of glass, but not limited to this, and can be made of other materials with high Abbe numbers.

In the present optical lens assembly, if the object-side or the image-side surface of the lenses with refractive power is convex and the location of the convex surface is not defined, the object-side or the image-side surface of the lenses near the optical axis is convex. If the object-side or the image-side surface of the lenses is concave and the location of the concave surface is not defined, the object-side the image-side surface of the lenses near the optical axis is concave.

The optical lens assembly of the present invention can be used in focusing optical systems and can obtain better image quality. The optical lens assembly of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. An optical lens assembly, in order from an object side to an image side, comprising:
    a first lens with negative refractive power, comprising an object-side surface and an image-side surface, the object-side surface of the first lens being convex near an optical axis and the image-side surface of the first lens being concave near the optical axis;
    a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric;
    a third lens with positive refractive power, comprising an object-side surface and an image-side surface, the image-side surface of the third lens being convex near the optical axis, and at least one of the object-side surface and the image-side surface of the third lens being aspheric;
    a stop;
    a fourth lens with positive refractive power, comprising an object-side surface and an image-side surface, the object-side surface of the fourth lens being convex near the optical axis and the image-side surface of the fourth lens being convex near the optical axis, and at least one of the object-side surface and the image-side surface of the fourth lens being aspheric;
    a fifth lens with negative refractive power, comprising an object-side surface and an image-side surface, the object-side surface of the fifth lens being concave near the optical axis and the image-side surface of the fifth lens being concave near the optical axis, and the object-side surface and the image-side surface of the fifth lens being aspheric;
    a sixth lens with positive refractive power, comprising an object-side surface and an image-side surface, the object-side surface of the sixth lens being convex near the optical axis and the image-side surface of the sixth lens being convex near the optical axis; and
    a seventh lens with negative refractive power, comprising an object-side surface and an image-side surface, the object-side surface of the seventh lens being convex near the optical axis and the image-side surface of the seventh lens being concave near the optical axis, and at least one of the object-side surface and the image-side surface of the seventh lens being aspheric;
    wherein a focal length of the first lens is f1, a focal length of the sixth lens is f6, a radius of curvature of the object-side surface of the first lens is R1, a radius of curvature of the image-side surface of the first lens is R2, and following conditions are satisfied: $-5.74 < f1/f6 < -1.83$ and $0.26 < R2/R1 < 0.56$.

2. The optical lens assembly as claimed in claim 1, wherein a focal length of the optical lens assembly is f, the focal length of the first lens is f1, and following condition is satisfied: $-0.34 < f/f1 < -0.1$.

3. The optical lens assembly as claimed in claim 1, wherein a focal length of the fifth lens is f5, a focal length of the seventh lens is f7, and following condition is satisfied: $0.11 < f5/f7 < 0.71$.

4. The optical lens assembly as claimed in claim 1, wherein a focal length of the fifth lens is f5, the focal length of the sixth lens is f6, a focal length of the seventh lens is f7, and following condition is satisfied: $0.44\ \text{mm}^{-1} < f7/(f5*f6) < 4.06\ \text{mm}^{-1}$.

5. The optical lens assembly as claimed in claim 1, wherein a focal length of the fifth lens is f5, a radius of curvature of the image-side surface of the fifth lens is R10, a central thickness of the fifth lens along the optical axis is CT5, and following condition is satisfied: $-4.82\ \text{mm}^{-1} < f5/(R10*CT5) < -2.04\ \text{mm}^{-1}$.

6. The optical lens assembly as claimed in claim 1, wherein a central thickness of the first lens along the optical axis is CT1, a central thickness of the second lens along the optical axis is CT2, the radius of curvature of the image-side surface of the first lens is R2, a radius of curvature of the image-side surface of the second lens is R4, and following condition is satisfied: $0.17\ \text{mm}^{-1} < (CT1+CT2)/(R2*R4) < 1.05\ \text{mm}^{-1}$.

7. The optical lens assembly as claimed in claim 1, wherein a focal length of the third lens is f3, a focal length of the fifth lens is f5, a focal length of the seventh lens is f7, and following condition is satisfied: $0.3\ \text{mm}^{-1} < f3/(f5*f7) < 1.58\ \text{mm}^{-1}$.

8. The optical lens assembly as claimed in claim 1, wherein a focal length of the second lens is f2, a focal length of the fourth lens is f4, the focal length of the sixth lens is f6, and following condition is satisfied: $-1.46\ \text{mm}^{-1} < f2/(f4*f6) < -0.58\ \text{mm}^{-1}$.

9. The optical lens assembly as claimed in claim 1, wherein a radius of curvature of the object-side surface of the seventh lens is R13, a radius of curvature of the image-side surface of the seventh lens is R14, a focal length of the seventh lens is f7, and following condition is satisfied: $-2.27\ \text{mm}^{-1} < R13/(R14*f7) < -0.18\ \text{mm}^{-1}$.

10. The optical lens assembly as claimed in claim 1, wherein a focal length of the seventh lens is f7, a central thickness of the seventh lens along the optical axis is CT7, a radius of curvature of the image-side surface of the seventh lens is R14, and following condition is satisfied: $-2.19\ \text{mm} < f7*CT7/R14 < -0.62\ \text{mm}$.

11. The optical lens assembly as claimed in claim 1, wherein a focal length of the fourth lens is f4, a focal length of the fifth lens is f5, a radius of curvature of the object-side surface of the fourth lens is R7, a radius of curvature of the image-side surface of the fourth lens is R8, a radius of curvature of the image-side surface of the fifth lens is R10, and following condition is satisfied: $0.34\ \text{mm}^{-1} < (R10*f5)/(R7*R8*f4) < 1.08\ \text{mm}^{-1}$.

12. The optical lens assembly as claimed in claim 1, wherein the radius of curvature of the object-side surface of the first lens is R1, the radius of curvature of the image-side surface of the first lens is R2, and following condition is satisfied: $0.33 \leq R2/R1 < 0.56$.

13. A photographing module, comprising:
a lens barrel,
an optical lens assembly disposed in the lens barrel, and
an image sensor disposed on an image plane of the optical lens assembly,
wherein the optical lens assembly, in order from an object side to an image side, comprising:
a first lens with negative refractive power, comprising an object-side surface and an image-side surface, the object-side surface of the first lens being convex near an optical axis and the image-side surface of the first lens being concave near the optical axis;
a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric;
a third lens with positive refractive power, comprising an object-side surface and an image-side surface, the image-side surface of the third lens being convex near the optical axis, and at least one of the object-side surface and the image-side surface of the third lens being aspheric;
a stop;
a fourth lens with positive refractive power, comprising an object-side surface and an image-side surface, the object-side surface of the fourth lens being convex near the optical axis and the image-side surface of the fourth lens being convex near the optical axis, and at least one of the object-side surface and the image-side surface of the fourth lens being aspheric;
a fifth lens with negative refractive power, comprising an object-side surface and an image-side surface, the object-side surface of the fifth lens being concave near the optical axis and the image-side surface of the fifth lens being concave near the optical axis, and the object-side surface and the image-side surface of the fifth lens being aspheric;
a sixth lens with positive refractive power, comprising an object-side surface and an image-side surface, the object-side surface of the sixth lens being convex near the optical axis and the image-side surface of the sixth lens being convex near the optical axis; and
a seventh lens with negative refractive power, comprising an object-side surface and an image-side surface, the object-side surface of the seventh lens being convex near the optical axis and the image-side surface of the seventh lens being concave near the optical axis, and at least one of the object-side surface and the image-side surface of the seventh lens being aspheric;
wherein a focal length of the first lens is f1, a focal length of the sixth lens is f6, a radius of curvature of the object-side surface of the first lens is R1, a radius of curvature of the image-side surface of the first lens is R2, and following conditions are satisfied: −5.74<f1/f6<−1.83 and 0.26<R2/R1<0.56.

14. A photographing module, comprising:
a lens barrel,
an optical lens assembly disposed in the lens barrel, and
an image sensor disposed on an image plane of the optical lens assembly,
wherein the optical lens assembly, in order from an object side to an image side, comprising:
a first lens with negative refractive power, comprising an object-side surface and an image-side surface, the object-side surface of the first lens being convex near an optical axis and the image-side surface of the first lens being concave near the optical axis;
a second lens with negative refractive power, comprising an object-side surface and an image-side surface, the object-side surface of the second lens being convex near the optical axis and the image-side surface of the second lens being concave near the optical axis, and at least one of the object-side surface and the image-side surface of the second lens being aspheric;
a third lens with positive refractive power, comprising an object-side surface and an image-side surface, the image-side surface of the third lens being convex near the optical axis, and at least one of the object-side surface and the image-side surface of the third lens being aspheric;
a stop;
a fourth lens with positive refractive power, comprising an object-side surface and an image-side surface, the object-side surface of the fourth lens being convex near the optical axis and the image-side surface of the fourth lens being convex near the optical axis, and at least one of the object-side surface and the image-side surface of the fourth lens being aspheric;
a fifth lens with negative refractive power, comprising an object-side surface and an image-side surface, the object-side surface of the fifth lens being concave near the optical axis and the image-side surface of the fifth lens being concave near the optical axis, and at least one of the object-side surface and the image-side surface of the fifth lens being aspheric;
a sixth lens with positive refractive power, comprising an object-side surface and an image-side surface, the object-side surface of the sixth lens being convex near the optical axis and the image-side surface of the sixth lens being convex near the optical axis; and
a seventh lens with negative refractive power, comprising an object-side surface and an image-side surface, the object-side surface of the seventh lens being convex near the optical axis and the image-side surface of the seventh lens being concave near the optical axis, and at least one of the object-side surface and the image-side surface of the seventh lens being aspheric;
wherein a distance from the object-side surface of the first lens to the image plane along the optical axis is TL, a radius of curvature of the image-side surface of the second lens is R4, half of a diagonal length of an effective pixel area of the image sensor is IMH, a radius of curvature of the object-side surface of the first lens is R1, a radius of curvature of the image-side surface of the first lens is R2, and following conditions are satisfied: 2.7 mm<TL*R4/IMH<9.23 mm and 0.26<R2/R1<0.56.

15. The photographing module as claimed in claim 14, wherein a focal length of the first lens is f1, a focal length of the sixth lens is f6, and following condition is satisfied: −5.74<f1/f6<−1.83.

16. The photographing module as claimed in claim 14, wherein a focal length of the fifth lens is f5, a focal length of the sixth lens is f6, a focal length of the seventh lens is f7, and following condition is satisfied: 0.44 mm$^{-1}$<f7/(f5*f6)<4.06 mm$^{-1}$.

17. The photographing module as claimed in claim 14, wherein a central thickness of the first lens along the optical axis is CT1, a central thickness of the second lens along the optical axis is CT2, the radius of curvature of the image-side surface of the first lens is R2, the radius of curvature of the image-side surface of the second lens is R4, and following condition is satisfied: 0.17 $mm^{-1}$<(CT1+CT2)/(R2*R4)<1.05 $mm^{-1}$.

18. The photographing module as claimed in claim 14, wherein a focal length of the third lens is f3, a focal length of the fifth lens is f5, a focal length of the seventh lens is f7, and following condition is satisfied: 0.3 $mm^{-1}$<f3/(f5*f7)<1.58 $mm^{-1}$.

19. The photographing module as claimed in claim 14, wherein a focal length of the seventh lens is f7, a central thickness of the seventh lens along the optical axis is CT7, a radius of curvature of the image-side surface of the seventh lens is R14, and following condition is satisfied: −2.19 mm<f7*CT7/R14<−0.62 mm.

20. The photographing module as claimed in claim 14, wherein a focal length of the fourth lens is f4, a focal length of the fifth lens is f5, a radius of curvature of the object-side surface of the fourth lens is R7, a radius of curvature of the image-side surface of the fourth lens is R8, a radius of curvature of the image-side surface of the fifth lens is R10, and following condition is satisfied: 0.34 $mm^{-1}$<(R10*f5)/(R7*R8*f4)<1.08 $mm^{-1}$.

\* \* \* \* \*